US009547918B2

(12) United States Patent
Clarberg

(10) Patent No.: US 9,547,918 B2
(45) Date of Patent: Jan. 17, 2017

(54) TECHNIQUES FOR DEFERRED DECOUPLED SHADING

(71) Applicant: INTEL CORPORATION, Santa Clara, CA (US)

(72) Inventor: Franz Petrik Clarberg, Lund (SE)

(73) Assignee: INTEL CORPORATION, Santa Clara ( * ) Notice: Subject to any disclaimer, the term of this patent is extended or adjusted under 35 U.S.C. 154(b) by 205 days.

(21) Appl. No.: 14/292,415

(22) Filed: May 30, 2014

(65) Prior Publication Data

US 2015/0348283 A1    Dec. 3, 2015

(51) Int. Cl.
| | |
|---|---|
| G06T 11/00 | (2006.01) |
| G06T 1/20 | (2006.01) |
| G06T 15/80 | (2011.01) |
| G06T 17/10 | (2006.01) |
| G06T 15/00 | (2011.01) |

(52) U.S. Cl.
CPC ............... *G06T 11/00* (2013.01); *G06T 1/20* (2013.01); *G06T 15/005* (2013.01); *G06T 15/80* (2013.01); *G06T 17/10* (2013.01)

(58) Field of Classification Search
CPC ........ G06T 15/005; G06T 11/40; G06T 15/80; G06T 1/20; G06T 15/40; G06T 2207/20016
See application file for complete search history.

(56) References Cited

U.S. PATENT DOCUMENTS

| | | |
|---|---|---|
| 2002/0118212 A1 | 8/2002 | Lake et al. |
| 2002/0171665 A1 | 11/2002 | Ramani et al. |
| 2006/0132495 A1 | 6/2006 | Anderson |
| 2010/0134494 A1 | 6/2010 | Lim et al. |
| 2012/0293515 A1 | 11/2012 | Clarberg et al. |

OTHER PUBLICATIONS

Chajdas et al., Subpixel Reconstruction Antialiasing for Deferred Shading, I3D 2011, Feb. 18-20, 2011, pp. 15-22.*
Andersson, et al., "Adaptive Texture Space Shading for Stochastic Rasterization", Computer Graphics Forum (Eurographics 2014), 33(2), 2014.
Burns et al., "A Lazy Object-Space Shading Architecture with Decoupled Sampling", High Performance Graphics (2010), 10 pages.

(Continued)

*Primary Examiner* — Haixia Du

(57) ABSTRACT

Various embodiments are generally directed to techniques for reducing the processing demands of shading primitives in rendering a 2D screen image from a 3D model. A device includes a fine rasterizing component to employ multiple screen image samples per screen image pixel to perform fine rasterization to identify a set of visible primitives, a coarse rasterizing component to employ a single shading image sample per shading image pixel to perform coarse rasterization from the same perspective as the fine rasterization to identify at least one primitive along a path of a shading image pixel, and a shading component to shade a primitive identified by a screen image sample of a first screen image pixel as visible within the shading image pixel and identified as along the path of the shading image sample associated with the shading image pixel to derive a color value. Other embodiments are described and claimed.

25 Claims, 15 Drawing Sheets

(56) References Cited

OTHER PUBLICATIONS

Clarberg et al., "A Sort-Based Deferred Shading Architecture for Decoupled Sampling", ACM Transactions on Graphics, 32(4), 141:1-10, 2013.
Clarberg et al., "AMFS: Adaptive Multi-Frequency Shading for Future Graphics Processors", ACM Transactions on Graphics, vol. 33, No. 4, Article 141, Jul. 2014, 12 pages.
Hasselgren et al., "Conservative Rasterization", GPU Gems 2, Addison-Wesley Professional, <http://http.developer.nvidia.com/GPUGems2/gpugems2_chapter42.html>, ch. 42, 2005, 11 pages.
Liktor et al., "Decoupled Deferred Shading for Hardware Rasterization", I3D '12 Proceedings of the ACM SIGGRAPH Symposium on Interactive 3D Graphics and Games, 2012, 8 pages.
McGuire et al., "Real-Time Stochastic Rasterization on Conventional GPU Architectures", High Performance Graphics, pp. 173-182, 2010.
Ragan-Kelley et al., "Decoupled Sampling for Graphics Pipelines", ACM Transactions on Graphics, 30(3), 17:1-17, 2011.
Vaidyanathan et al., "Coarse pixel shading", High Performance Graphics Jun. 2014, 10 pages.
International Search Report and Written Opinion received for PCT Patent Application No. PCT/US2015/028204, mailed Aug. 7, 2015, 9 pages.

\* cited by examiner

TECHNIQUES FOR DEFERRED DECOUPLED SHADING

BACKGROUND

The rendering of two-dimensional (2D) computer generated images (CGI) from three-dimensional (3D) models, once done only as part of performing relatively specialized computer-based functions, is increasingly employed in ever more aspects of operating computing devices. Specifically, although video games continue to present the most prevalent use of such images, their use has begun to take hold in websites and as part of graphical user interfaces (GUIs) of an ever increasing array of devices.

Although advances in the design of graphics rendering hardware and increases in the efficiency of rendering algorithms have enabled much of this increasing use of CGI based on 3D models, these advances and efficiency increases have not been sufficient to fully address the limits in processing and power resources that are typical in portable devices. Specifically, the work of shading graphics primitives to provide color and texture to objects in an image continues to demand considerable processing resources, which in turn, places considerable demands on the limited power resources afforded by the batteries and/or other power sources typically found in portable devices. Further, as the pixel resolutions of the displays incorporated into portable devices continue to increase, reductions that have been made in processing and power requirements have been overwhelmed by the exponential increase in the amount of shading caused by such resolution increases. Still further, as expectations of realism in CGI have heightened, shading has become more routinely augmented with implementing motion blur and/or depth-of-field effects.

Previous efforts have been made to at least limit these increasing demands on power resources by attempting to directly reduce the amount of shading that is performed. Various techniques have been devised to make determinations of what graphics primitives and/or what portions of graphics primitives actually need to be shaded. Unfortunately, despite alleviating some of the shading burden, many of these previous efforts require extensive changes to graphics rendering hardware that can ironically increase power resource requirements, including ever more specialized graphics processing units (GPUs) and/or considerable alteration of the architectures of typical hardware-based graphics rendering pipelines to support such features as the generation and sorting of complex buffers.

DETAILED DESCRIPTION

Figure 1:
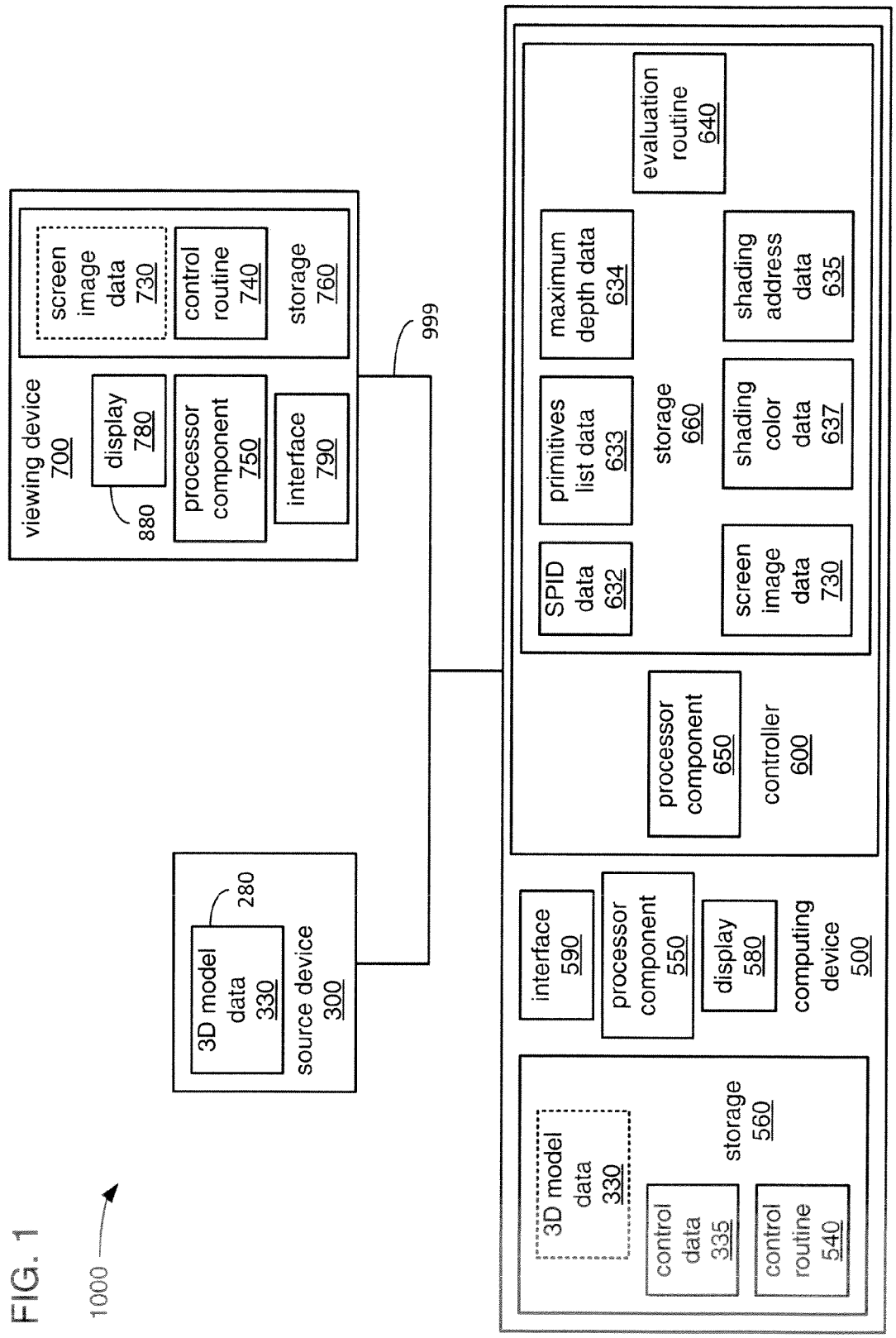
FIG. 1 illustrates an example embodiment of a graphics rendering system.

Various embodiments are generally directed to techniques for reducing the processing demands of shading primitives in rendering a 2D screen image from a 3D model, including decoupling shading from rasterizing and application of effects in screen space, deferring performance of shading to a later stage in shading space, and avoiding the use of G-buffers and/or other complex data structures to support shading. A fine rasterization is employed to identify the geometry of the primitives of the 3D model that are visible in the screen image pixels of the screen image to enable the shading to be limited to such visible geometry. Then, a coarse rasterization is employed to identify all primitives of the 3D model that may be candidates for shading in each shading image pixel of a shading image that corresponds to the screen image. The shading is performed on the shading image in a shading space that is separate from the screen space in which the screen image is generated for viewing to enable the shading to be performed at a pixel resolution of the shading image that may differ from the pixel resolution of the screen image to reduce shading complexity. Color values derived for shading image pixels are then transferred to the pixels of the screen image. Motion blur and/or depth-of-field effects may be applied either during the fine rasterization or following the transfer of color values to the screen image.

The fine rasterization may employ any of a variety of types of sampling, including stochastic sampling, multisampling, ray tracing, etc. in which there are multiple screen image samples allocated to each screen image pixel of the screen image to identify the portions of the primitives of the 3D model that are visible from the perspective of the screen image at the locations of the screen image pixels. As such visible primitives are so identified, a data structure may be generated that correlates each screen image sample to a visible primitive and to a shading image pixel of the shading image. This data structure may be made up of shading point identifiers (SPIDs), each of which correlates one screen image sample to a visible primitive by reference to an identifier uniquely assigned to each primitive. Each of the SPIDs may also correlate one screen image sample to a shading image pixel by reference to the coordinates of that shading image pixel within the shading image.

Following generation of the SPIDs, the SPIDs may be analyzed to generate a data structure made up of lists, one list for each shading image pixel. Each list may include identifiers of the visible primitives identified by the screen image samples as falling within the area covered by its associated shading image pixel. Each list may also include an indication of the depths of the visible primitives within its associated shading image pixel. In some embodiments, as each of the SPIDs is analyzed, another data structure may be generated that indicates, for each shading image pixel, the greatest of the depths found among the visible primitives identified by the screen image samples within the area covered by that shading image pixel. Alternatively or additionally, still another data structure may be generated that correlates each screen image sample to an address location at which a color value derived from shading the visible primitive associated with that screen image sample within that shading image pixel is stored, and from which a color value of that screen image sample may be assigned after shading.

Following the generation and analysis of the SPIDs, the coarse rasterization and the shading may be performed together, one visible primitive within each shading image pixel at a time. In the coarse rasterization, each shading image pixel is effectively treated as a relatively wide and blunt sample to identify all primitives of the 3D model having any portion thereof that is present within the area covered by that shading image pixel. As recognizable to those skilled in the art, such use of each shading image pixel as a wide and blunt sample may be accomplished through use of outer conservative rasterization in performing the coarse rasterization. This sampling is performed from the same perspective as the sampling earlier performed as part of the fine rasterization. For each primitive found to be present within the area of a shading image pixel, the list of visible primitives generated earlier for that pixel from the SPIDs is checked to determine if that primitive is identified in that list as a visible primitive in the screen image by one of the screen image samples that falls within that shading image pixel. If so, then shading is performed to derive a color of that primitive within the area covered by that shading image pixel, and that color is stored. If not, then no shading is performed for that primitive for the area covered by that shading image pixel. In some embodiments, the earlier generated data structure indicating the greatest depths among the visible primitives identified in each such list may be employed to increase the efficiency with which the determination is made as to whether that primitive is identified in that list.

After shading has been performed for all of the visible primitives across all of the pixels of the shading image, the color values of the colors derived for each visible primitive within each shading image pixel are transferred to the screen image pixels. As previously discussed, each SPID correlates one of the screen image samples to a visible primitive and to a shading image pixel, and those correlations may be used to assign color values derived for each visible primitive during the shading to the screen image sample associated with each SPID. Alternatively or additionally, the efficiency with which each screen image sample is assigned a color may be increased by using the earlier generated data structure correlating each screen image sample to an address location at which the color value derived from shading the visible primitive associated with that screen image sample within that shading image pixel is stored.

Regardless of the exact manner in which each screen image sample is assigned a color derived during the shading, the screen image samples are employed to transfer the colors derived during shading to the screen image pixels. Thus, for each screen image pixel, the color values of its screen image samples may be averaged and/or combined in any of a variety of ways to derive the single color value for that screen image pixel. As will be explained in greater detail, the size and/or boundaries of the screen image pixels and the shading image pixels may or may not coincide. More specifically, in some embodiments, there may be a one-to-one correspondence therebetween. However, in other embodiments, the shading image pixels may be larger and/or smaller than the screen image pixels, and/or the boundaries of the screen image pixels and the shading image pixels may not be aligned. As a result, a screen image pixel may cover an area of the screen image that includes samples from more than one shading image pixel, and therefore, the averaging of screen image samples falling within each screen image pixel may serve to combine color values from multiple shading image pixels.

In embodiments in which the screen image is meant to portray motion blur and/or depth-of-field effects, a filter may be employed in addition to or in lieu of averaging the color values of the screen image samples as part of applying motion blur and/or depth-of-field effects. In some embodiments, the filter itself may apply motion blur and/or depth-of-field effects. However, in other embodiments, motion blur and/or depth-of-field effects may be applied during generation of the SPIDs to intentionally introduce noise into the correlation of screen image pixels and the SPIDs. As recognizable to those skilled in the art, such an introduction of noise may be accomplished through any of a variety of techniques, including and not limited to, stochastic sampling over a time dimension and/or a lens dimension during performance of the fine rasterization. In such other embodiments, the filter employed during derivation of the single color value for each screen image pixel may include pixel color values from neighboring screen image pixels to reduce the undesirable effects of introducing such noise.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a graphics rendering system 1000 incorporating one or more of a source device 300, a computing device 500 and a viewing device 700. The computing device 500 generates a two-dimensional (2D) screen image 880 of a three-dimensional (3D) model 280 as projected onto a 2D plane of the screen image 880. The computing device 500 may receive 3D model data 330 representing the 3D model 280 of one or more objects within a defined 3D space from the source device 300. The 3D model data 330 may either directly specify the primitives making up the one or more objects of the model 280, or may include enough information to enable derivation of those primitives.

Following generation of the screen image 880, the computing device 500 may present the screen image 880 on the display 580 and/or transmit screen image data 730 representing the screen image 880 to the viewing device 700 to be presented on a display 780 thereof. The screen image data 730 may include a bitmap of the screen image 880 in which the colors of each pixel of the screen image 880 may be encoded in any of a variety of formats. In some embodiments, the pixel resolution of the screen image 880 may be selected to match the pixel resolution of the display 580 and/or of the display 780. Indeed, in some embodiments, the viewing device 700 may provide an indication of the pixel resolution of the display 780 to the computing device 500 to enable the pixel resolution of the screen image 880 to be set to match the pixel resolution of the display 780.

Each of these computing devices may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 300, 500 and 700 exchange signals conveying data representing a 3D model and/or a 2D screen image through a network 999. However, one or more of these computing devices may exchange other data entirely unrelated to rendering a 2D image from a 3D model with each other and/or with still other computing devices (not shown) via the network 999. In various embodiments, the network may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 500 incorporates one or more of a processor component 550, a storage 560, a display 580, a controller 600 and an interface 590 to couple the computing device 500 to the network 999. The storage 560 stores one or more of a control routine 540, the 3D model data 330 and control data 335. The controller 600 incorporates one or more of a processor component 650 and a storage 660. The storage 660 stores one or more of an evaluation routine 640, SPID data 632, primitives list data 633, maximum depth data 634, shading address data 635, shading color data 637 and the screen image data 730.

The control routine 540 incorporates a sequence of instructions operative on the processor component 550 in its role as a main processor component of the computing device 500 to implement logic to perform various functions. In executing the control routine 540, the processor component 550 may receive the 3D model data 330 from the source device 300 via the network 999, and may store at least a portion thereof that represents at least a portion of the 3D model 280 in the storage 560. It should be noted that the 3D model data 330 may be stored in the storage 560 for a considerable amount of time before any use is made of it, including generating 2D images thereof or transmission. In some embodiments, the processor component 550 may analyze the 3D model data 330 to derive at least a subset of the primitives that make up the 3D model 280 of one or more objects. In other embodiments, the 3D model data 330 may more directly specify details of those primitives, rendering such analysis by the processor component 550 unnecessary. Following generation of the screen image data 730 representing the screen image 880, the processor component 550 may visually present the image 880 on the display 580 for viewing and/or transmit the screen image data 730 to the viewing device 700 to enable the screen image 880 to be presented on the display 780 for viewing.

In some embodiments, the processor component 550 may receive indications of various configuration parameters to employ in generating the screen image 880 from the 3D model 280. For example, in embodiments in which the screen image 880 is to be transmitted to the viewing device 700 for presentation on the display 780, indications may be received from the viewing device 700 (e.g., via the network 999) of the pixel resolution, color depth, frame rate and/or other parameters of the display 780. By way of another example, indications of location and/or orientation of the plane and/or boundaries of the screen image 880 relative to the 3D model 280 may be received from the viewing device 700 and/or from still another device (not shown) via the network 999. The processor component 550 may store indications of such parameters as part of the control data 335 for use by the processor component 650 in generating the screen image 880. Alternatively or additionally, the indications of pixel resolution may be of the display 580, rather than the display 780.

The evaluation routine 640 incorporates a sequence of instructions operative on the processor component 650 in its role as a controller processor component of the controller 600 of the computing device 500 to implement logic to perform various functions. In executing the evaluation routine 640, the processor component 650 generates the screen image data 730 representing the screen image 880 from the 3D model data 330 representing the 3D model 280. More precisely, the processor component 650 renders the screen image 880 as a 2D projection of the 3D model 280 onto the plane of the screen image 880.

Figure 3:
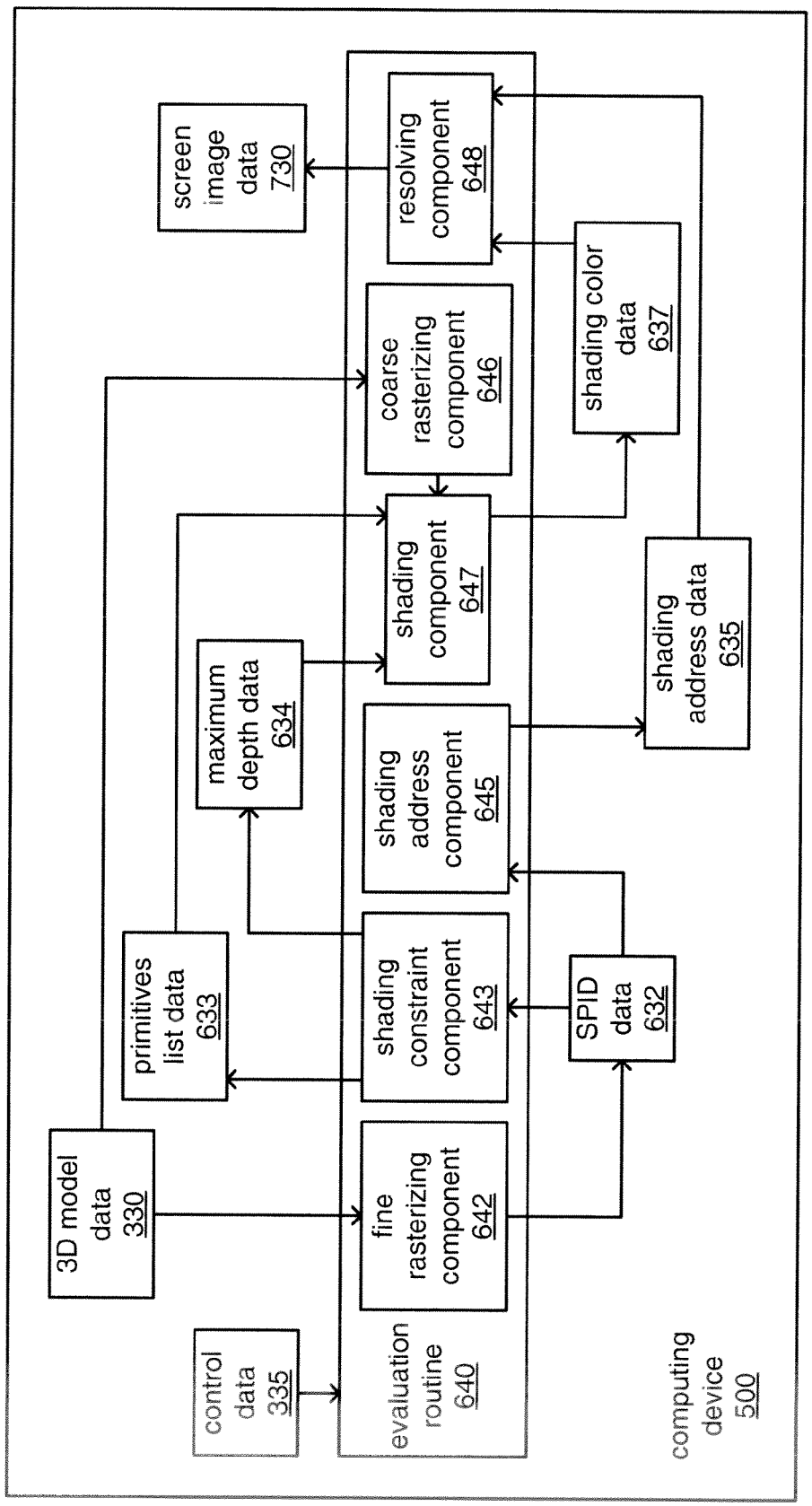
FIG. 3 illustrates a portion of an example embodiment.

FIG. 3 depicts an example embodiment of such generation of the screen image data 730 representing the screen image 880 from the 3D model data 330 representing the 3D model 280. As depicted, the evaluation routine 640 may incorporate one or more of a fine rasterizing component 642, a shading constraint component 643, a shading address component 645, a coarse rasterizing component 646, a shading component 647 and a resolving component 648. In executing the evaluation routine 640, the processor component 650 may execute one or more of the components 642, 643, 645, 646, 647 and 648 of the evaluation routine 640.

Figure 4:
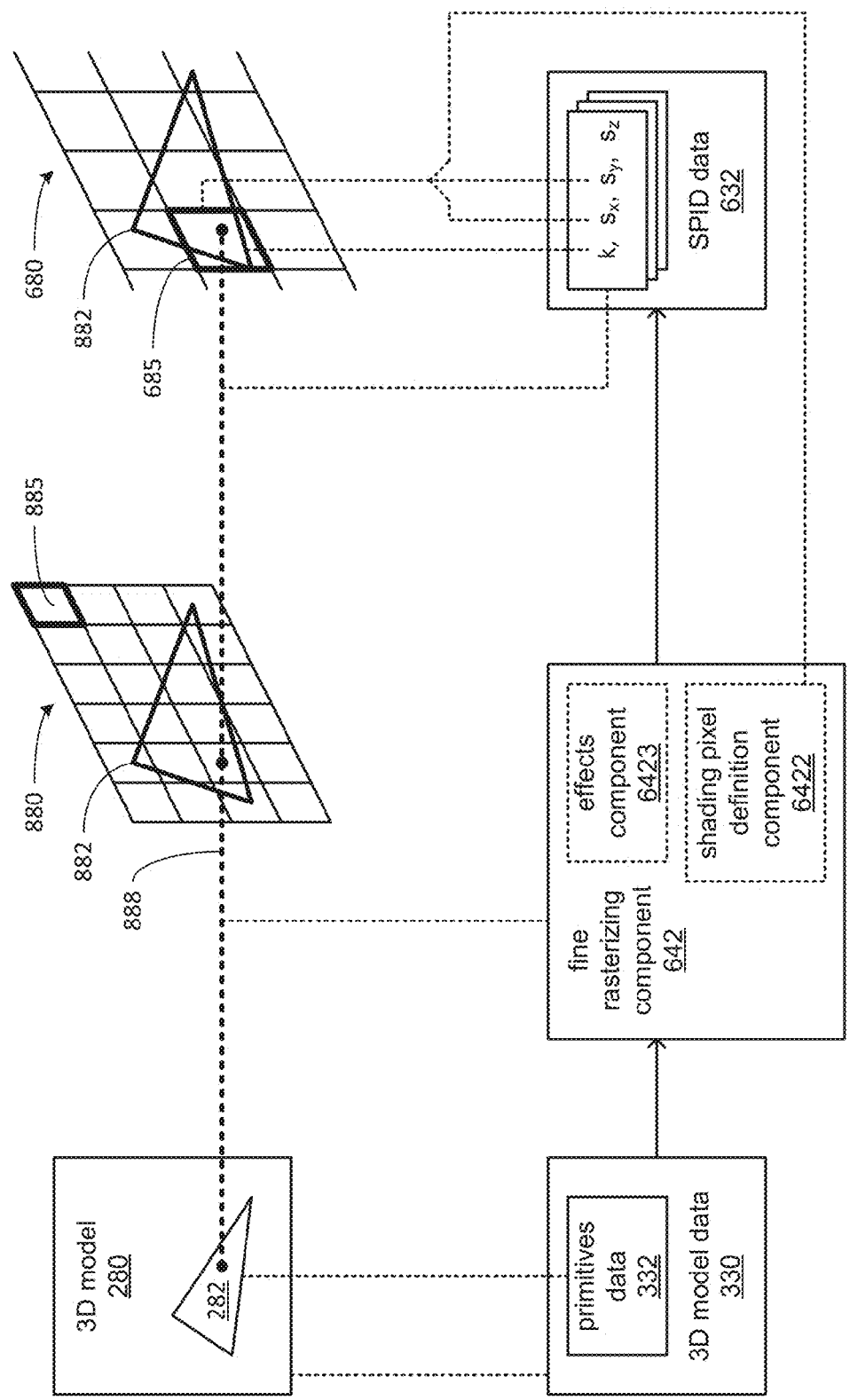
FIG. 4 illustrates an example embodiment of rasterization of a 3D model.

The fine rasterizing component 642 may retrieve an indication of the location and orientation of the plane of the screen image 880 relative to the one or more objects of the 3D model 280, as well as the boundaries of the screen image 880 within that plane, from the control data 335. The fine rasterizing component 642 may then employ that indication in a fine rasterization of graphics primitives of the one or more objects of the 3D model 280 using multiple samples for each pixel of the screen image 880 to determine which of those primitives are the visible primitives that are at least partly visible in the screen image 880. FIG. 4 depicts aspects of an example of this fine rasterization in greater detail. As depicted, the 3D model data 330 may incorporate primitives data 332 that includes indications of various characteristics of the primitives 282, such as size, shape, location and/or orientation. As familiar to those skilled in the art, each primitive 282 may be any of a variety of types of polygon, each of which extends within a single plane, but the majority of primitives (if not all) in typical 3D models are triangles.

In performing fine rasterization to determine which primitives 282 of the 3D model 280 are also visible primitives 882 that are at least partly visible in the screen image 880, the fine rasterizing component 642 may project numerous screen image samples 888 (only one of which is depicted for sake of visual clarity) for each screen image pixel 885 of the screen image 880 towards the 3D model 280. In so projecting the screen image samples 888, any of a variety of sampling techniques may be used in selecting the quantity of screen image samples 888 per screen image pixel 885, and in selecting the locations of the screen image samples 888 within the area covered by each screen image pixel 885. Such techniques include, and are not limited to, supersampling, multisampling, stochastic sampling (including stochastic sampling over a time dimension and/or a lens dimension to impart motion blur and/or depth-of-field effects), and/or ray tracing. As each screen image sample 888 is projected (like a line extending from and normal to the plane of the screen image 880) towards the 3D model 280, the first primitive 282 of the 3D model 280 encountered by each screen image sample 888 becomes a visible primitive 882 that is at least partly visible in the screen image 880.

As has been discussed, the screen image 880 is generated to be visually presented on a display, such as the display 580 of the computing device 500 or the display 780 of the viewing device 700. Therefore, and as familiar to those skilled in the art, the screen image 880 and the screen image data 730 that represents the screen image 880 are said to be generated in a "screen space," since the image data 730 represents imagery that is to be seen. As also familiar to those skilled in the art, shading is typically performed together with rasterization to directly derive at least a portion of image data that represents an image in screen space, and thus, shading is typically said to be done "in screen space." However, in executing the evaluation routine 640, the shading is decoupled from the fine rasterization performed in screen space and is deferred to a later stage such that it is not performed with the fine rasterization in screen space. Instead, the processor component 650, in executing the evaluation routine 640, performs the shading to generate the shading image 680, which corresponds to the screen image 880, but is separate and distinct from the screen image 880, and is not meant to be seen. More specifically, the decoupled and deferred shading is performed along with a coarse rasterization to generate the shading image 680 in a "shading space."

At least a subset of the content of the shading image 680 in shading space parallels the content of the screen image 880 in screen space. More specifically, the relative locations of the visible primitives 882 and of the screen image samples 888 correspond between the screen image 880 and the shading image 680. Further, the boundaries that define the edges of both of the images 880 and 680 may correspond such that the locations of the visible primitives 882 and of the screen image samples 888 relative to those boundaries may also correspond. Still further, in some embodiments, the screen image pixels 885 of the screen image 880 may have a one-to-one correspondence with the shading image pixels 685 of the shading image 680. However, in other embodiments, and as depicted in FIG. 4, the pixels 885 and 685 may not correspond in size and/or in alignment of the boundaries of the areas that each cover.

Figure 5A:
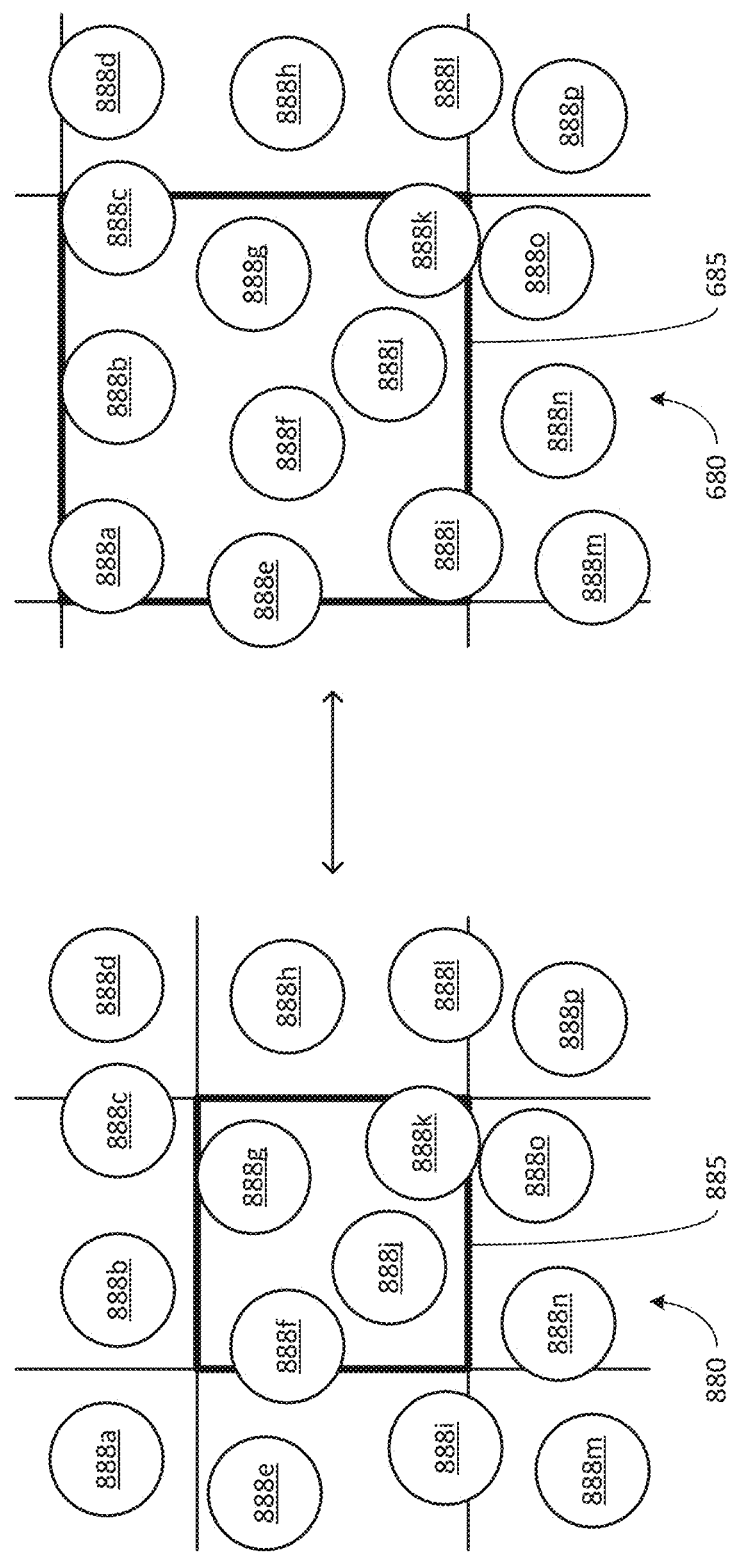
FIGS. 5A and 5B illustrates example embodiments of correspondence between screen and shading spaces.
Figure 5B:
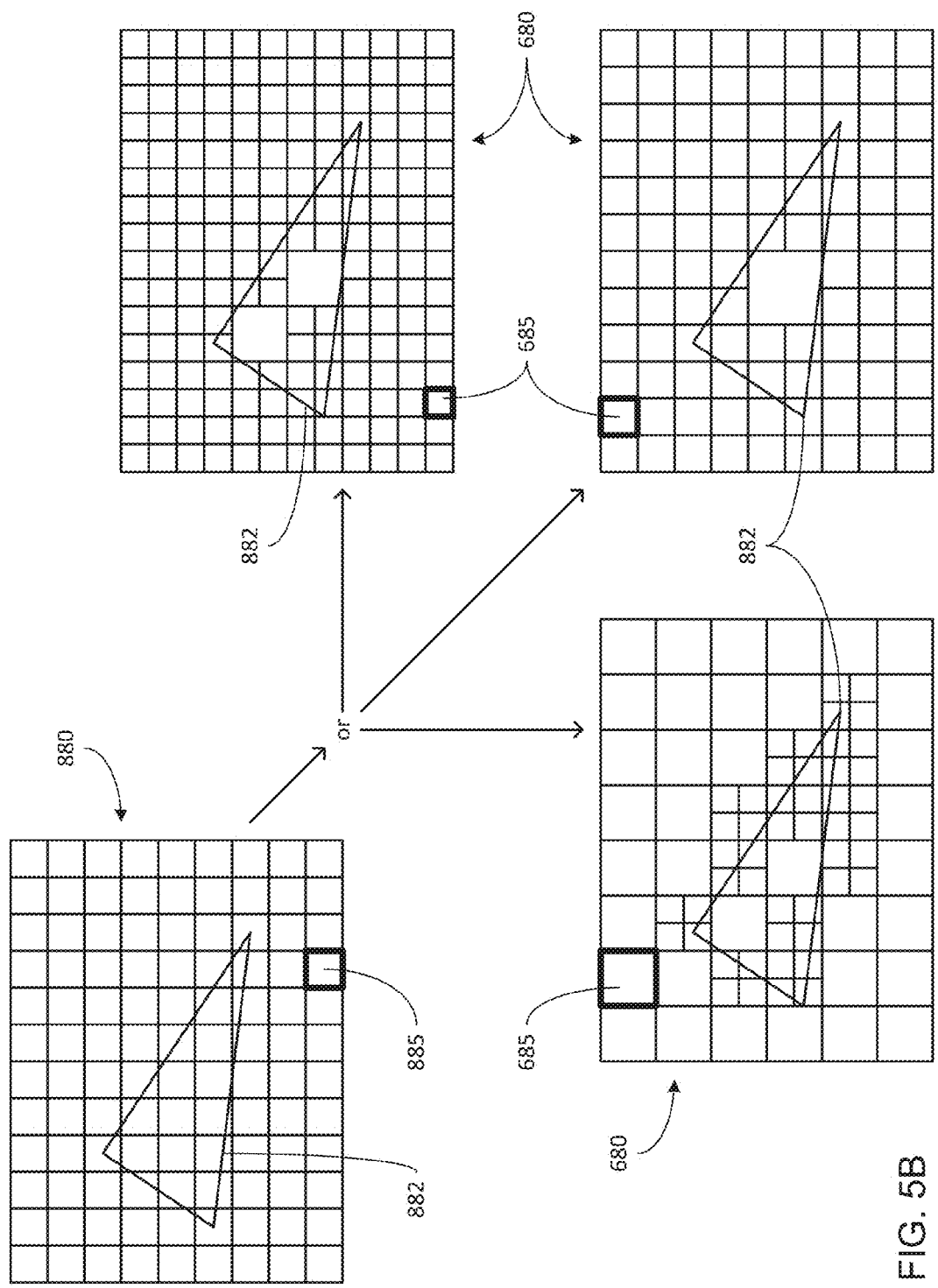

FIGS. 5A and 5B depict examples of various ways in which the size and/or alignment of boundaries of the screen image pixels 885 may not correspond to the size and/or alignment of the shading image pixels 685. Turning to FIG. 5A, stochastic sampling is employed in a performance of fine rasterization by the fine rasterizing component 642, as indicated by the irregular allocation (e.g., an allocation that is not grid-like) of sixteen screen image samples 888a through 888p among the screen image pixels 885. As can be seen, four of the screen image samples 888f, 888g, 888j and 888k are positioned largely within the area covered by one of the screen image pixels 885. However, as also depicted, at least one of the shading image pixels 685 covers a larger area such that nine of the screen image samples 888a, 888b, 888c, 888e, 888f, 888g, 888i, 888j and 888k are positioned largely within the covered area.

Turning to FIG. 5B, in some embodiments, different ones of the shading image pixels 685 may be of different sizes such that some cover more of the area of the shading image 680 than others. Further, it may be that none of the different sizes of the shading image pixels 685 are the same as the size of the screen image pixels 885. For example, it may be deemed desirable to employ different sizes of the shading image pixels 685 at different locations in the shading image 680 in an effort to reduce the overall quantity of the shading image pixels 685 to be shaded as an approach to reduce required processing resources, and correspondingly, to reduce required power resources. Specifically, and as depicted, smaller sized ones of the shading image pixels 685 coinciding with a substantially uninterrupted expanse of a visible primitive 882 may be combined based on an assumption that the colors that will be derived for all of the shading image pixels 685 that are so combined will be substantially similar such that an opportunity is presented to derive only one color. Alternatively or additionally, larger sized ones of the shading image pixels 685 coinciding with an edge of a visible primitive 882 may be subdivided into a greater quantity of smaller sized ones of the shading image pixels 685 based on an assumption that the colors on either side of the edge are apt to be different and that such subdividing of one or more of the shading image pixels 685 will enable the edge to be made more visually clear by enabling a clearer depiction of those colors.

Returning to FIG. 4, as the fine rasterizing component 642 performs fine rasterization to identify the visible primitives 882, the fine rasterizing component 642 may a generate shading point identifier (SPID) for each screen image sample 888, and store the SPIDs as part of the SPID data 632. There is a one-to-one correspondence between the SPIDs and the screen image samples 888 such that each SPID corresponds to one and only one screen image sample 888.

Each SPID may include an identifier k for the visible primitive 882 identified by the screen image sample 888, the coordinates $s_x$, $s_y$ of the shading image pixel 685 that covers an area within the shading image 680 in which that screen image sample 888 falls, and an indication of the depth $s_z$ of that visible primitive 882 at that shading image pixel 685. Thus, the SPIDs provide a mechanism to correlate the screen image pixels 885 of the screen image 880 in screen space to the shading image pixels 685 of the shading image 680 in shading space through the screen image samples 888. As will be explained in greater detail, this correlation is used to transfer color values from the shading image 680 to the screen image 880 following shading of the shading image 680.

In some embodiments, the fine rasterizing component 642 may include a shading pixel definition component 6422 to analyze the quantity of visible primitives 882 found to be visible within each screen image pixel 885 and vary the size of one or more of the shading image pixels 685 relative to the screen image pixels 885 to control the quantity of visible primitives 882 that are visible within each of the one or more shading image pixels 685. More precisely, the shading pixel definition component 6422 may determine a single common size for all of the shading image pixels 685 that may be larger or smaller than the size of the screen image pixels 885. Alternatively or additionally, the shading pixel definition component 6422 may combine and/or subdivide one or more of the shading image pixels 685, as was depicted in FIG. 5B, such that the shading image pixels 685 may be of varying sizes. As was discussed with reference to FIG. 5B, varying the area of the shading image 680 covered by at least a subset of the shading image pixels 685 may reduce the processing requirements (and accordingly, the power requirements) of the shading to be performed.

In some embodiments, the fine rasterizing component 642 may include an effects component 6423 to alter the manner in which the SPIDs are generated to impart motion blur and/or depth-of-field effects. For example, where stochastic sampling is used by the fine rasterizing component 642 to project the screen image samples 888 towards the 3D model 280 to identify the visible primitives 882 in the screen image 880, the effects component may introduce motion blur by imparting a temporal dimension to at least some of the screen image samples 888 to displace them in time in accordance with movement to be portrayed in the image 880. More specifically, the identifiers k of at least some of the screen image samples 888 may be redistributed thereamong to introduce a degree of noise in the association of those screen image samples 888 to the visible primitives 882, thereby causing blurring. Such redistribution of the identifiers k may be limited to occurring among the screen image samples 888 within a screen image pixel 885, or may be occur among the screen image samples 888 of multiple screen image pixels 885, depending on the degree of motion blur applied. By way of another example where stochastic sampling is again used by the fine rasterizing component 642, the effects component 6423 may introduce a depth-of-field effect by imparting a lens coordinate to at least some of the screen image samples 888 to displace them in accordance with lens parameters.

Figure 6:
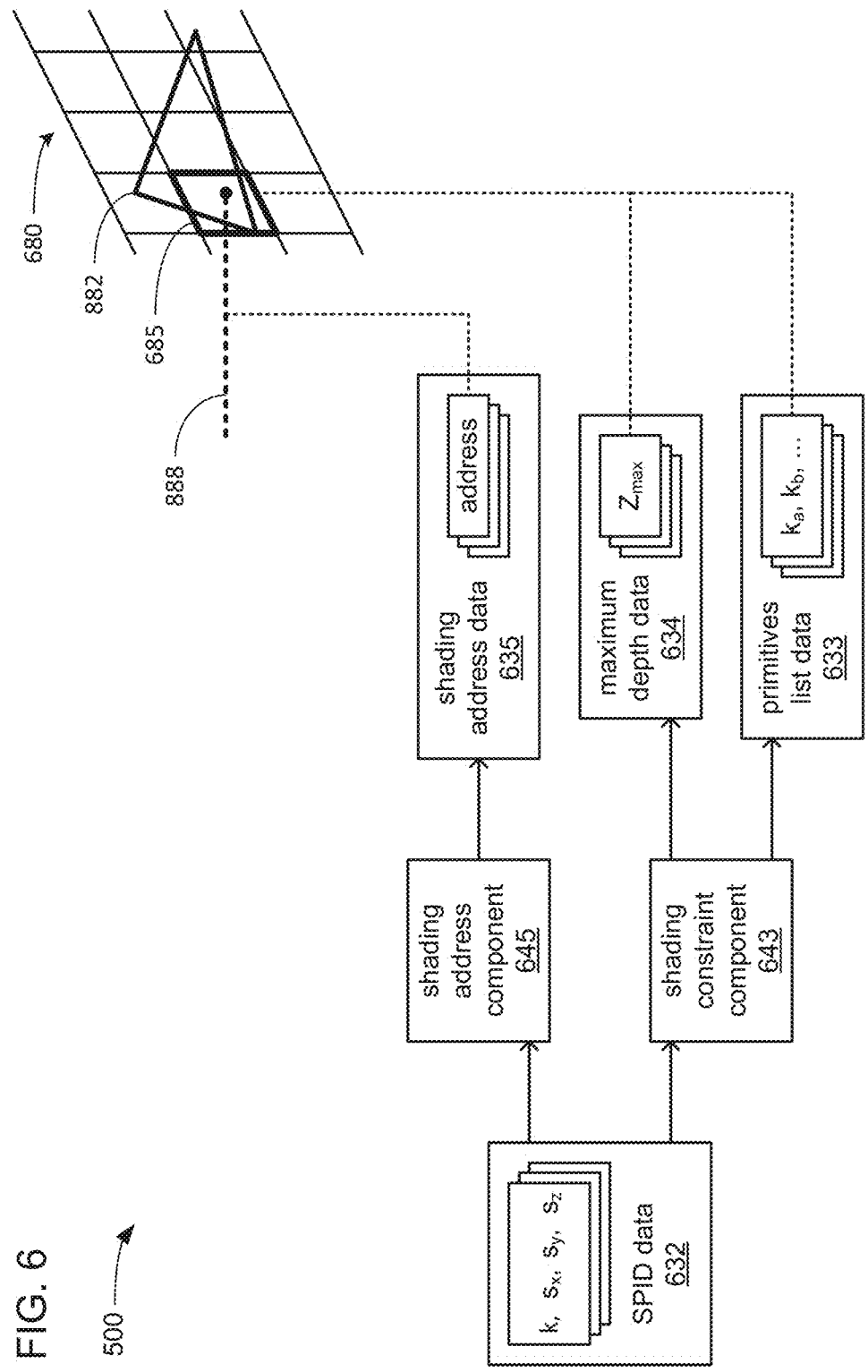
FIG. 6 illustrates an example embodiment of preparations for shading in a shading space.

Returning to FIG. 3, following generation of the SPIDs of the SPID data 632 by the fine rasterizing component 642, the shading constraint component 643 retrieves and analyzes each SPID of the SPID data 632 to derive a list of visible primitives 882 detected with the screen image samples 888 as being visible within each shading image pixel 685. FIG. 6 depicts aspects of an example of generating such per-pixel lists in greater detail. More specifically, for each shading image pixel 685, the shading constraint component 643 generates a list of all of the visible primitives 882 that are visible within the area of the shading image 680 covered by that pixel 685 (as detected via the screen image samples 888), and stores that list for that shading image pixel 685 as part of the primitives list data 633. As depicted, such a list for each shading image pixel 685 may be made up of the identifiers $k_a$, $k_b$, . . . that identify the visible primitives 882 that are visible within that shading image pixel 685. To generate the lists of the primitives list data 633, the shading constraint component 643 may retrieve the coordinates $s_x$, $s_y$ from each SPID to identify which shading image pixel 685 the SPID is associated with, then retrieve the identifier k of the visible primitive 882 the SPID is associated with, and then add the retrieved identifier k to the list in the primitives list data 633 for that shading image pixel 685 identified by the retrieved coordinates $s_x$, $s_y$.

Each such list in the primitives list data 633 may be a compacted list in which each visible primitive 882 that is visible within the corresponding shading image pixel 685 is listed only once in the primitives list data 633, regardless of how many of SPIDs associated with that corresponding shading image pixel 685 refer to that same visible primitive 882. In some embodiments, the shading constraint component 643 may condition adding an identifier k specified in a SPID to a list in the primitives list data 633 on whether that identifier k is not already listed in the list to avoid adding duplicate identifiers. In other embodiments, the shading constraint component 643 may add an identifier k to a list in the primitives list data 633 as the shading constraint component 643 iterates through all of the SPIDs of the SPID data 632 without regard to whether that identifier k is already listed in that list, and then may subsequently iterate through all of the lists in the primitives list data 633 to remove any duplicate identifiers.

Although the quantity of screen image samples 888 falling within each shading image pixel 685 may be known before the SPID data 632 is generated, the quantity of visible primitives 882 that are visible within any of the shading image pixels 685 may not be knowable until the SPIDs are analyzed. Therefore, although each list within the primitives list data 633 may be implemented using any of a variety of types of data structure, it may be deemed desirable to employ a data structure that is variable in overall size to implement each list, such as a linked-list data structure. Alternatively, any of a variety of array type data structures may be used in which the size of each array is selected to be large enough to accommodate the largest possible quantity of visible primitives 882 that may be deemed likely to be visible within a single one of the shading image pixels 685. In some embodiments, as the shading constraint component 643 analyzes the SPIDs of the SPID data 632, the shading constraint component 643 may also store in the maximum depth data 634 an indication, for each shading image pixel 685, of the deepest depth $Z_{max}$ (from the perspective of the plane of the screen image 880) reached by any of the visible primitives 882 that are detected to be visible within that shading image pixel 685 via the screen image samples 888 that fall within that shading image pixel 685.

In some embodiments, the SPIDs of the SPID data 632 may also be retrieved and analyzed by the shading address component 645 to derive addresses specifying locations within the storage 660 at which color values specifying the colors to be derived during shading for each visible primitive 882 that is visible within each shading image pixel 685 that is specified in the SPID data 632. The shading address component 645 may store indications of these addresses, one indication per SPID, as the shading address data 635. As previously discussed, there is a one-to-one correspondence between the samples 888 and the SPIDs of the SPID data 632. Therefore, in deriving one of these addresses for each SPID, the shading address component 645 essentially derives, for each sample 888, the address within the storage 660 from which a color value indicating the color for that sample 888 may be retrieved following the shading of the shading image 680.

Returning to FIG. 3, following generation of at least the primitives list data 633, if not also the maximum depth data 634 and/or the shading address data 635, the coarse rasterizing component 646 performs another rasterization of the 3D model 280 from the same perspective of the same plane of the screen image 880, but with the shading image 680 substituted into that perspective. This rasterization is a coarse rasterization inasmuch as there is only one shading image sample 688 used per shading image pixel 685, and that one shading image sample 688 in each shading image pixel 685 is effectively widened to cover the entire area of the shading image 680 that is covered by its associated shading image pixel 685. In this coarse rasterization of the coarse rasterization component 646, the single wider shading image sample 688 of each shading image pixel 685 is used to detect all primitives 282 of the 3D model 280 that exist along the path of that shading image sample 688 projected all the way through the 3D model 280, regardless of whether those primitives 282 are visible, or not. It should be noted that the coarser shading image samples 688 are projected normal to the same plane as the finer screen image samples 888 such that the paths of the shading image samples 688 and the screen image samples 888 are projected in parallel to each other. Along with identifying all of the primitives along the path of each shading image sample 688, other data concerning orientation of the plane of each primitive 282 along that path, depth of each primitive 282 along that path and/or still other information pertinent to shading is retrieved using the that shading image sample 688.

Thus, the fine and coarse rasterizations performed by the fine rasterizing component 642 and the coarse rasterization component 646, respectively, are very different in character and serve very different functions. As has been discussed, the fine rasterization of the fine rasterization component 642 employs multiple ones of the much narrower screen image samples 888 per screen image pixel 885 to identify which of the primitives 282 of the 3D model 280 are visible primitives 882. Also, such use of the multiple narrower screen image samples 888 provides an indication of relative proportions of the area of each screen image pixel 885 that are covered by each visible primitive 882 that is visible therein. In contrast, the coarse rasterization of the coarse rasterization component 646 employs only one wider shading image sample 688 per shading image pixel 685 to identify all primitives 282 that exist along the path of that shading image sample 688 and retrieves further information per primitive 282 along that path that is pertinent to enabling shading.

Although the screen image samples 888 of the fine rasterization of the fine rasterizing component 642 could have been used to obtain further information pertinent to shading the visible primitives 882, the fact of the shading being performed separately in shading space would have required storing such information pertinent to shading for all of the screen image samples 888 in a relatively large data structure commonly referred to as a "G-buffer." As familiar to those skilled in the art of hardware architectures for typical graphics rendering systems, the generation of such a large and complex data structure to store so many different pieces of information per screen image sample 888 is often impossible to do in a manner that makes efficient use of the storage 560. More specifically, filling the entries of such a data structure often entails a succession of access operations that are difficult to effectively cache or organize to make efficient use of the typical row-column organization of storage locations of graphics rendering systems. Indeed, it may actually be more efficient to perform a second distinct rasterization process, such as the coarse rasterization of the coarse rasterizing component 646, to obtain the information pertinent to shading as the shading is performed, instead of attempting to store that information.

Therefore, as the coarse rasterizing component 646 progresses through each primitive 282 and each shading image sample 688, the coarse rasterizing component 646 provides information concerning all primitives 282 along the path of that shading image sample 688, along with information about those primitives 282 that is pertinent to shading, to the shading component 647 for use in performing shading within the shading image pixel 685 associated with that shading image sample 688.

Figure 7:
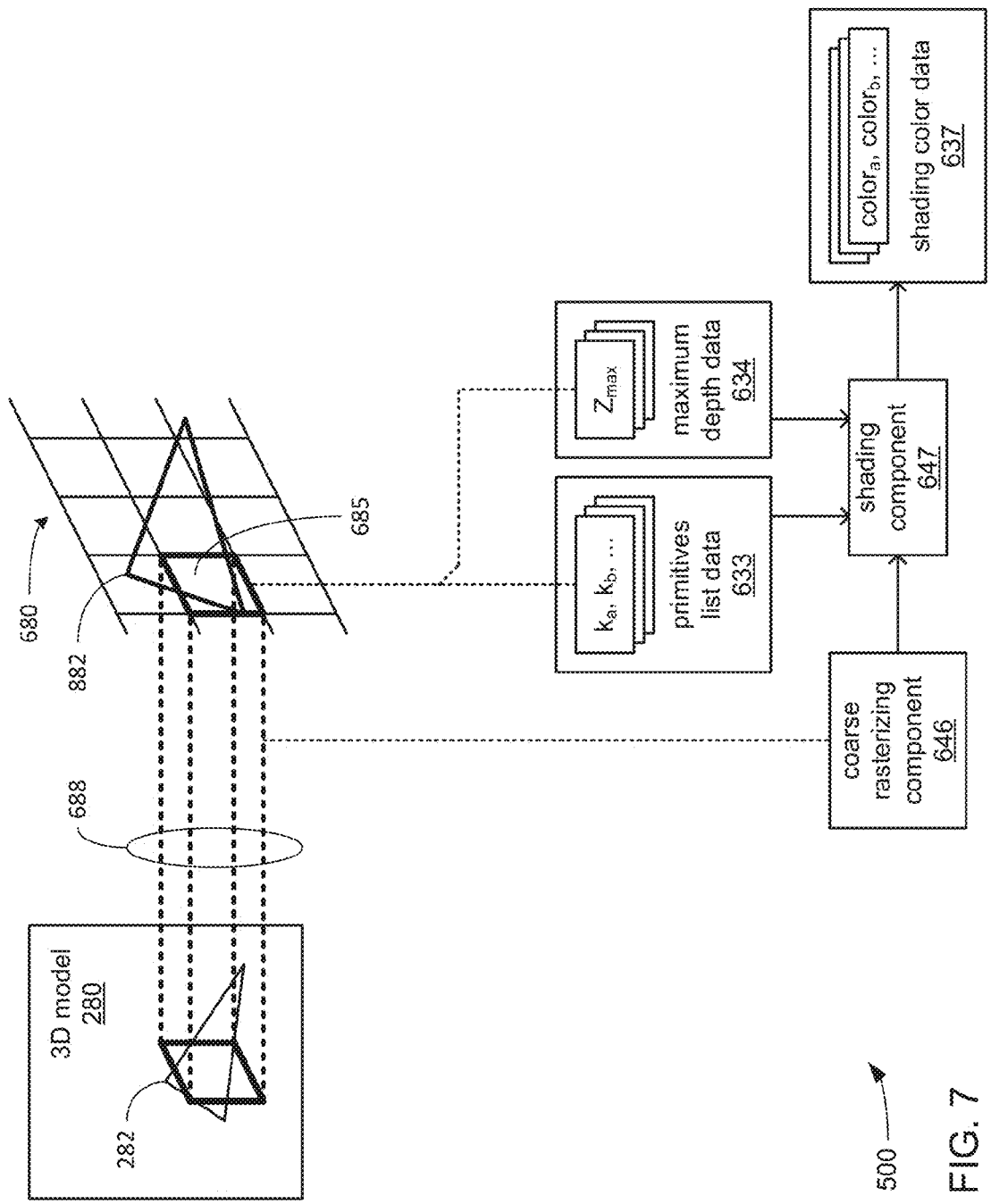
FIG. 7 illustrates an example embodiment of shading in a shading space.

FIG. 7 depicts aspects of an example of shading the shading image 680 in greater detail. For each shading image pixel 685, the shading component 647 may conditionally shade each primitive 282 detected along the path of the shading image sample 688 emanating from that shading image pixel 685, one at a time and in the order in which they are so detected. The condition imposed by the shading component 647 may be whether or not each primitive 282 detected via a shading image sample 688 was previously determined in the fine rasterization to be visible within the associated shading image pixel 685. In other words, for each primitive 282 detected along the path of a shading image sample 688, the shading component 647 may check the list in the primitives list data 633 for the shading image pixel 685 associated with that shading image sample 688 to determine whether that detected primitive 282 is listed as a visible primitive 882 within that shading image pixel 685. For that shading image pixel 685, the shading component 647 may then shade only the primitives 882 that are both detected along the path of that shading image sample 688 and that are listed in that list, storing indications of colors derived by such shading for that shading image pixel 685 as the shading color data 637.

More precisely, for each shading image pixel 685, the shading component 647 may receive identifiers k of each primitive 282 detected along the path of the shading image sample 688 associated with that shading image pixel 685. The shading component 647 may then check the list of identifiers $k_a$, $k_b$, . . . of visible primitives in the primitives list data 633 for that shading image pixel 685 to identify which ones of the primitives 282 detected along that path have a matching identifier in that list. Such a match in that list in the primitives list data 633 identifies one of the primitives 282 detected along that path as a visible primitive 882 that is visible within that shading image pixel 685. The shading component 647 then performs shading of each of the primitives 282 detected along that path and for which a match exists in that list, and stores the color values derived for each of those shaded primitives 282 in the shading color data 637.

As previously discussed, each list of the primitives list data 633 for one of the shading image pixels 685 includes an identifier for each visible primitive 882 that is visible within even a small portion of that shading image pixel 685. As familiar to those skilled in the art, the conditioning of shading of a particular visible primitive 882 within each pixel 685 on whether the identifier k of that particular visible primitive 882 is within the list for that pixel 685 means that the shading performed by the shading component 647 may be classified as a per-pixel form of outer conservative shading. More specifically, the shading is "conservative" in the sense that shading is performed only for primitives 282 of the 3D model 280 that are visible such that they are among the visible primitives 882. However, the shading includes the "outer" limits of the boundaries of each visible primitive 882 inasmuch as a visible primitive 882 is shaded in a pixel 685 even if only a small portion of that visible primitive 882 is visible within that pixel 685.

In embodiments in which the maximum depth data 634 is generated, the speed with which the shading component 647 determines whether to shade a primitive 282 detected along the path of a shading image sample 688 may be increased by the shading component 647 checking the depth of each such detected primitive 282 against the maximum depth $Z_{max}$ indicated in the maximum depth data 635 for the shading image pixel 685 associated with that shading image sample 688. If the depth of a primitive 282 along that shading image sample 688 is greater than the maximum depth $Z_{max}$ for the associated shading image pixel 685, then that detected primitive 282 is not visible within that shading image pixel 685, and there is no need to employ further processing resources in checking the identifier of that detected primitive 282 against the identifier(s) in the list within the primitives list data 633 for that shading image pixel 685. However, if the depth of that detected primitive 282 is equal to or less than the maximum depth $Z_{max}$ for that shading image pixel 685, then there is a possibility of that detected primitive 282 being visible within that shading image pixel 685 such that the shading component 647 may compare the identifier of that detected primitive 282 to the identifiers in that list to determine if that detected primitive 282 is visible within that shading image pixel 685.

Given that the shading performed by the shading component 647 derives one color per visible primitive 882 per shading image pixel 685, there may be more than one color derived by the shading component 647 for each shading image pixel 685. More precisely, the quantity of colors derived for each shading image pixel 685 is equal to the quantity of visible primitives 882 that are visible within that shading image pixel 685. Thus, for example, if there are three visible primitives 882 that are visible within a particular shading image pixel 685, then the shading component 647 performs shading for that pixel three times (once for each of the visible primitives 882 that are visible therein), and three color values (one for each of the visible primitives 882 that are visible therein) are stored for that particular shading image pixel 685 in the shading color data 637.

As a result of this one-to-one correspondence between the quantity of visible primitives 882 that are visible within each shading image pixel 685 and the quantity of colors derived for by the shading component 647 for each shading image pixel 685, the shading color data 637 may be made up of lists of color values with one list generated per pixel 685, not unlike the list of identifiers per pixel in the primitives list data 633. Indeed, the shading color data 637 may be made up of lists of colors (e.g., $color_a$, $color_b$, . . . , as depicted), one list per shading image pixel 685, that are implemented using a type of data structure similar to the type used in implementing the lists of identifiers of visible primitives 882 (e.g., $k_a$, $k_b$, . . . , as also depicted) in the primitives list data 633 (e.g., a linked list per shading image pixel 685). In some embodiments, the primitives list data 633 and the shading color data 637 may be combined such that each identifier k of a visible primitive 882 in each list may be accompanied by a corresponding color value as a result of the shading performed by the shading component 647.

Figure 8:
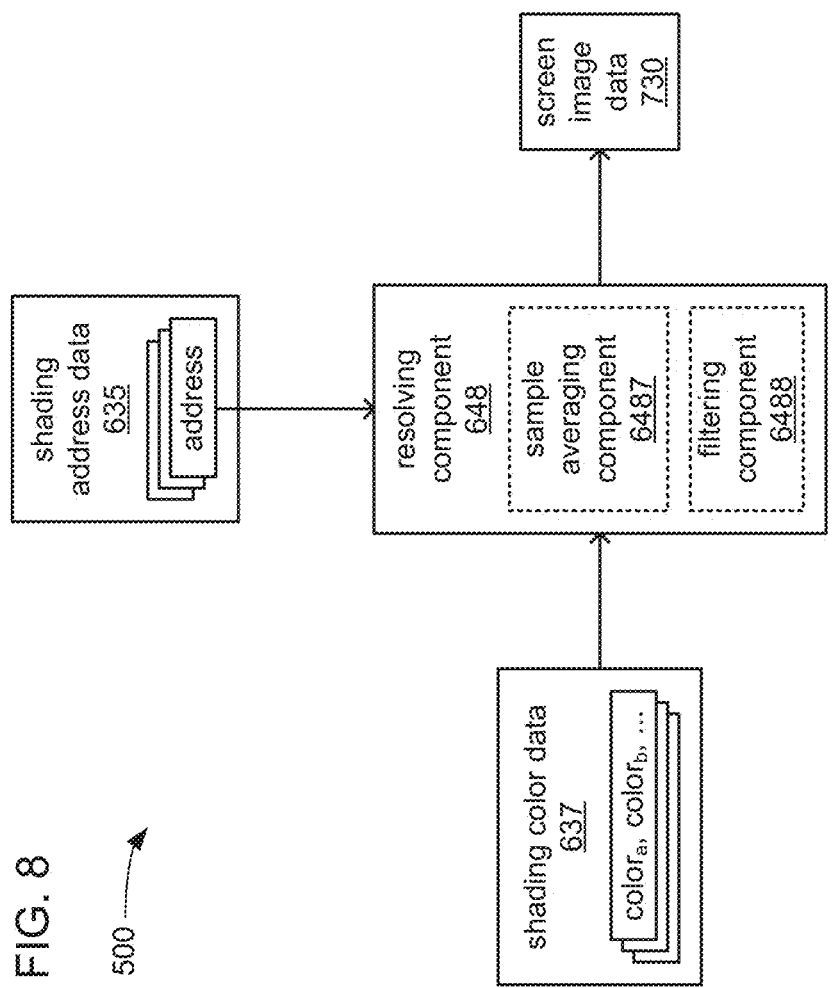
FIG. 8 illustrates an example embodiment of averaging sample colors to derive pixel colors in a screen space.

Returning to FIG. 3, following the performance of shading by the shading component 647, the resolving component 648 derives the colors of the screen image pixels 885 from the colors of the shading image pixels 685 via the screen image samples 888. In so doing, the resolving component 648 may also implement one or more filters to impart motion blur effects, impart depth-of-field effects, and/or remove noise elements from the implementation of motion blur and/or depth-of-field effects during the generation of the SPIDs, as earlier described in embodiments in which the screen image 880 is to portray motion blur and/or depth-of-field effects. FIG. 8 depicts aspects of an example of transferring pixel color values from the shading image pixels 685 to the screen image pixels 885 in greater detail.

As previously discussed, the screen image samples 888 have corresponding locations relative to each other and relative to locations of the visible primitives 882 within each of the screen image 880 and the shading image 680, thereby enabling the screen image samples 888 to be used to transfer the color value(s) of the shading image pixels 685 to the screen image pixels 885. As also previously discussed, each screen image sample 888 is associated with a SPID that includes an identifier of a visible primitive 882 that was detected via the associated screen image sample 888. As further previously discussed, there may be more than one color value derived by the shading of the shading image for each shading image pixel 685, specifically one color value per visible primitive 882 that is visible within that shading image pixel 685. Thus, the color value assigned to each screen image sample 888 from a shading image pixel 685 for transfer to a screen image pixel 885 is the color value derived within that shading image pixel 685 for the visible primitive 882 identified in the SPID that is associated with that screen image sample 888.

To effect assignment of color values to the screen image samples 888 in embodiments in which the shading address data 635 was earlier generated by the shading address component 645, the resolving component 648 retrieves from the shading address data 635 the addresses at which the colors values for each screen image sample 888 may be obtained. Again, for each screen image sample 888, its associated address in the shading address data 635 indicates where the color value can be obtained that was derived for the visible primitive 882 detected by that screen image sample 888 within the shading image pixel 685 in which that screen image sample 888 falls. The resolving component 648 then uses those addresses to retrieve the color values for the screen image samples 888 falling within each of the screen image pixels 885.

However, in embodiments in which the shading address data 635 was not earlier generated by the shading address component 645 (e.g., in embodiments that do not include the shading address component 645), assignment of color values to the screen image samples 888 may be effected by the resolving component 648 retrieving the SPID associated with each screen image sample 888 from the SPID data 632. From the SPID associated with each screen image sample 888, the resolving component 648 retrieves the coordinates $s_x$, $s_y$ of the shading image pixel 685 within which that screen image sample 888 falls and the identifier k of the visible primitive 882 that was detected by that screen image sample 888 during the fine rasterization performed by the fine rasterizing component 642. Using the coordinates $s_x$, $s_y$ and the identifier k retrieved for each screen image sample 888, the resolving component 648 derives the address from which the color value to be assigned to that screen image sample 888 may be retrieved.

Regardless of the exact manner in which the screen image samples 888 are assigned color values derived by the earlier shading of the shading image 680, in embodiments in which no motion blur or depth-of-field effects are to be portrayed in the image 880, the resolving component 648 may incorporate a sample averaging component 6487 to average the pixel color values of the screen image samples 888 falling within each screen image pixel 885 to derive the color value for that screen image pixel 885. However, in embodiments in which motion blur or depth-of-field effects are to be portrayed in the image 880, the resolving component 648 may apply a filter to derive the color value of each screen image pixel 885 from what may be a combination of the screen image samples 888 falling within that screen image pixel 885 and within its neighboring screen image pixels 885.

More specifically as an example, in embodiments in which the fine rasterizing component 642 includes the effects component 6423 to introduce motion blur during generation of the SPIDs of the SPID data 632, the resolving component 648 may incorporate a filtering component 6488 to reduce undesirable artifacts arising from the noise introduced by the effects component 6423 in redistributing the identifiers k of visible primitives 882 among the SPIDs. In performing such filtering, the filtering component 6488 may employ a weighted average to include, to a selected degree, color values of screen image samples 888 of neighboring screen image pixels 885 in deriving the color value of each screen image pixel 885 from the screen image samples 888 that fall within it.

Regardless of whether averaging and/or filtering is employed in deriving the color value of each screen image pixel 885, the resolving component 648 stores the color value for each of the screen image pixels 885 as part of the screen image data 730. With the value of each screen image pixel 885 stored in the screen image data 730, the screen image data 730 becomes a representation of the screen image 880. Returning to FIG. 1, following generation of the screen image data 730 representing the screen image 880, as has been described, the processing component 550 may present the image 880 on the display 580. Alternatively or additionally, the processor component 550 may operate the interface 590 to transmit the screen image data 730 to another device, such as the viewing device 700, to enable the presentation of the image 880 on another display, such as the display 780.

In various embodiments, the viewing device 700 incorporates one or more of a processor component 750, a storage 760, a display 780 and an interface 790 to couple the viewing device 700 to the network 999. The storage 760 stores one or more of a control routine 740 and the screen image data 730. The control routine 740 incorporates a sequence of instructions operative on the processor component 750 in its role as a main processor component of the viewing device 700 to implement logic to perform various functions. In executing the control routine 740 in some embodiments, the processor component 750 may operate the interface 790 to transmit an indication of the pixel resolution of the display 780 to the computing device 500. As previously discussed, such an indication may be stored within the computing device 500 as part of the control data 335, and later employed to one or more aspects of rendering the screen image 880 (e.g., setting the pixel resolution of the screen image 800). Alternatively or additionally, the processor component 750 may operate the interface 790 to receive the screen image data 730 representing the screen image 880 from the computing device 500 after the computing device 500 has rendered the screen image 880, as has been described. The processor component 750 may then visually present the motion screen image 880 on the display 780.

Figure 2:
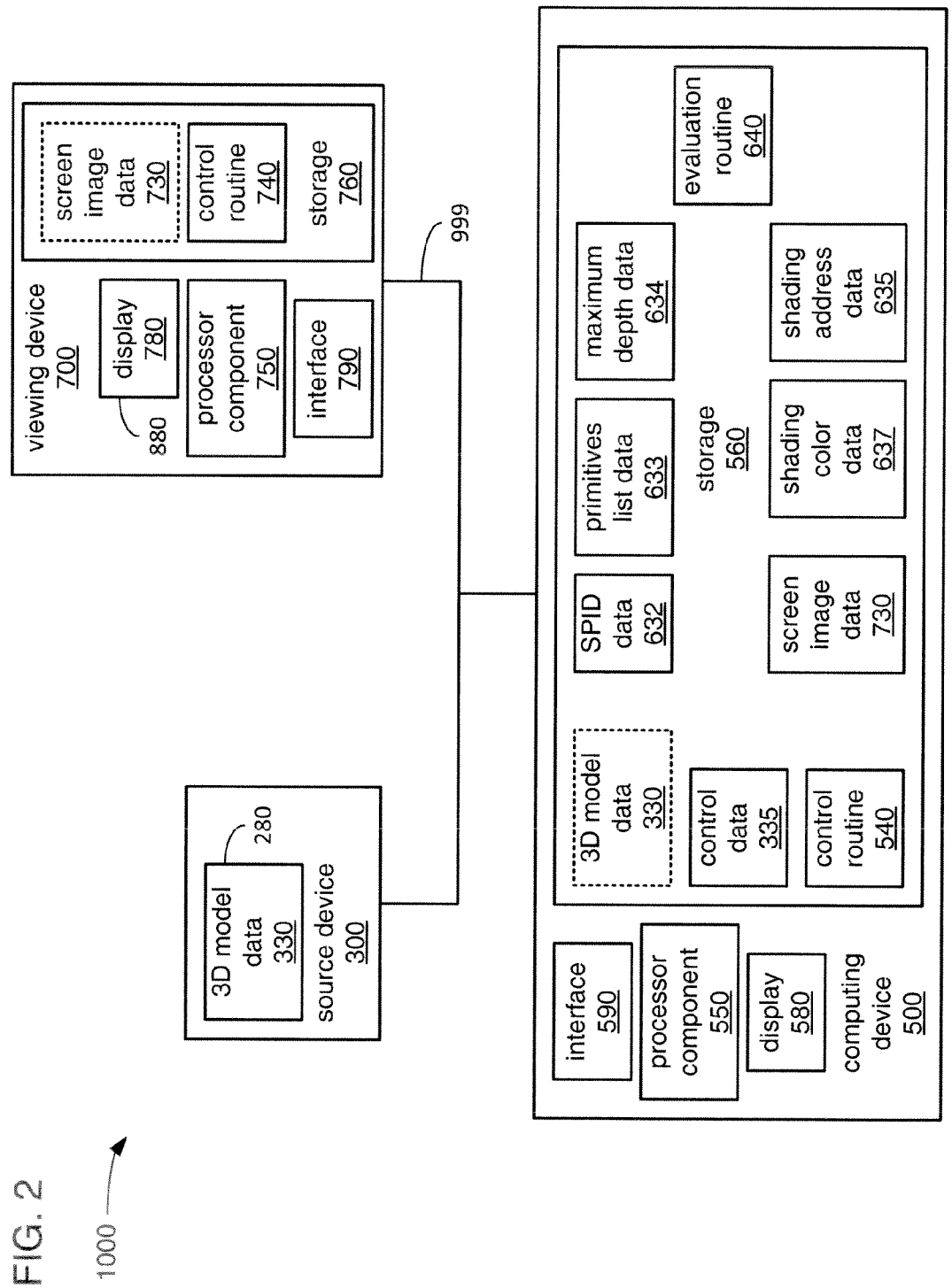
FIG. 2 illustrates an alternate example embodiment of a graphics rendering system.

FIG. 2 illustrates a block diagram of an alternate embodiment of the graphics rendering system 1000 that includes an alternate embodiment of the computing device 500. The alternate embodiment of the graphics rendering system 1000 of FIG. 2 is similar to the embodiment of FIG. 1 in many ways, and thus, like reference numerals are used to refer to like elements throughout. However, unlike the computing device 500 of FIG. 1, the computing device 500 of FIG. 2 does not incorporate the controller 600. Thus, unlike the computing device 500 of FIG. 1, in the computing device 500 of FIG. 2, the processor component 550 executes the evaluation routine 640 in lieu of there being a separate processor component 650 to do so. Therefore, in the alternate embodiment of the graphics rendering system 1000 of FIG. 2, the processor component 550 performs the rendering of the screen image 880, including the rasterizing, shading and transfer of color values in a manner not unlike what has been described with regard to execution of the evaluation routine 640 by the processor component 650.

In various embodiments, each of the processor components 550 and 650 may include any of a wide variety of commercially available processors. Also, one or more of these processor components may include multiple processors, a multi-threaded processor, a multi-core processor (whether the multiple cores coexist on the same or separate dies), and/or a multi processor architecture of some other variety by which multiple physically separate processors are in some way linked. Also, although each of the processor components 550 and 650 may include any of a variety of types of processor, it is envisioned that the processor component 650 of the controller 600 (if present) may be somewhat specialized and/or optimized to perform tasks related to graphics and/or video. More broadly, it is envisioned that the controller 600 embodies a graphics subsystem of the computing device 500 to enable the performance of tasks related to graphics rendering, video compression, image rescaling, etc., using components separate and distinct from the processor component 650 and its more closely related components.

In various embodiments, each of the storages 560, 660 and 760 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 590 and 790 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 9:
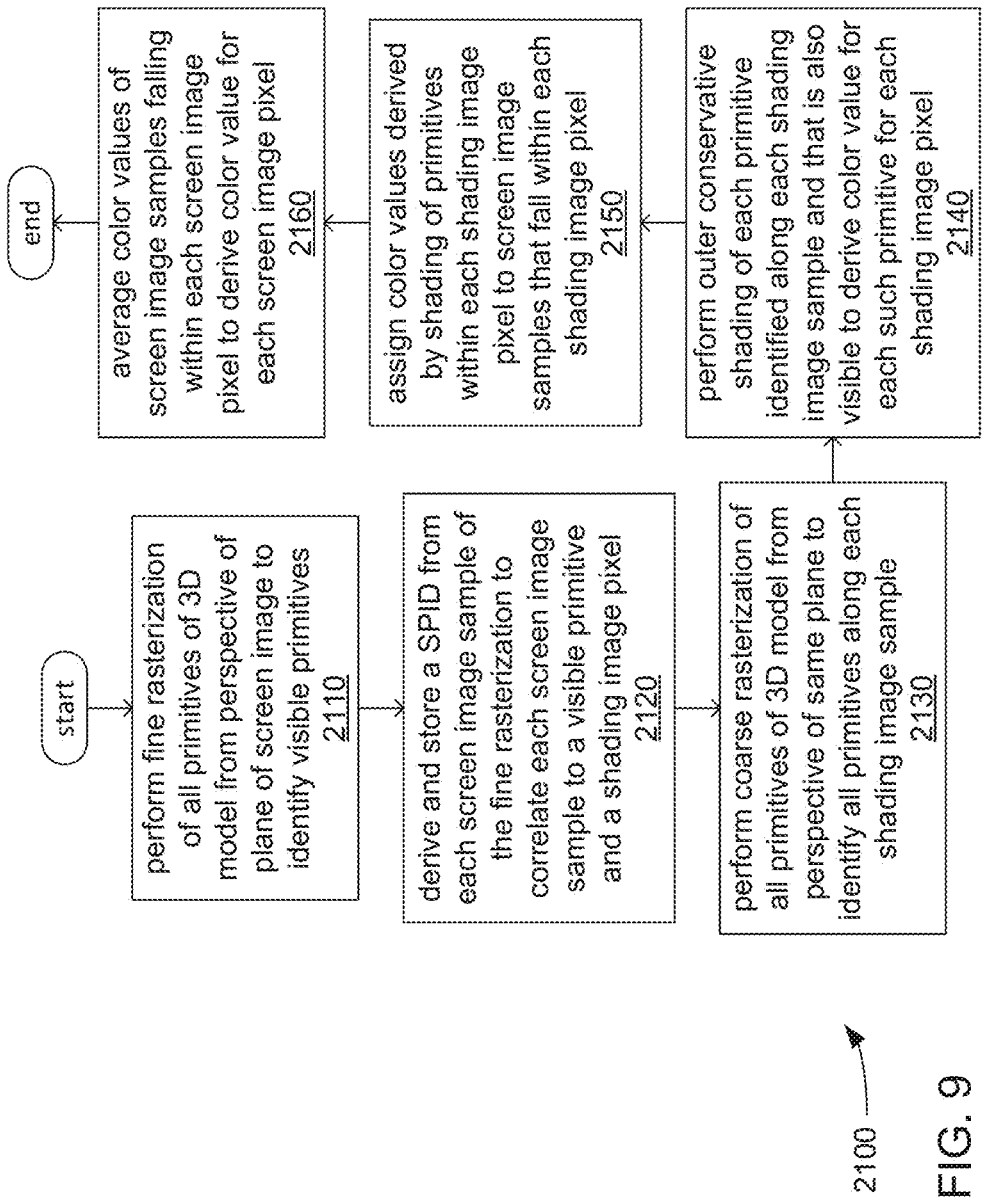
FIGS. 9-11 each illustrate a logic flow according to an embodiment.

FIG. 9 illustrates one embodiment of a logic flow 2100. The logic flow 2100 may be representative of some or all of the operations executed by one or more embodiments described herein. More specifically, the logic flow 2100 may illustrate operations performed by the processor components 550 and/or 650 in executing at least the evaluation routine 640, and/or performed by other component(s) of the computing device 500.

At 2110, a processor component of a computing device (e.g., the processor component 550 and/or 650 of the computing device 500) performs fine rasterization of all graphics primitives of a 3D model (e.g., the primitives 282 of the 3D model 280) from the perspective of a plane of a 2D screen image (e.g., the screen image 880) to be rendered from the 3D model to identify all of the primitives of the 3D model that are visible from that perspective (e.g., the visible primitives 882). As has been discussed, the location and/or orientation of such a plane, as well as the boundaries of the screen image within that plane, may be received from another computing device (e.g., the viewing device 700).

At 2120, each screen image sample of the fine rasterization (e.g., each screen image sample 888) is analyzed to generate a SPID that correlates the screen image sample to a primitive of the 3D model that was found via the screen image sample to be a visible primitive from the perspective of the screen image, and that correlates the screen image sample to a shading image pixel of a shading image (e.g., a shading image pixel 685 of the shading image 680) that corresponds to the screen image. The SPIDs may be stored as part of a larger data structure, such as an array of SPIDs. As has been discussed, the screen and shading images correlate to the extent that the relative locations of at least the visible primitives and the screen image samples coincide. However, the shading image pixels may differ from the screen image pixels (e.g., the screen image pixels 885) in size and/or the boundaries of the screen image pixels and shading image pixels may not align. Further, each SPID may also include an indication of the depth of the visible primitive at the shading image pixel to which the SPID correlates its associated screen image sample.

At 2130, the processor component performs coarse rasterization of all graphics primitives of the 3D model from the perspective of the same plane of the 2D screen image, but substituting the shading image, to identify all of the primitives of the 3D model that exist along the path of each shading image sample (e.g., a shading image sample 688). As has been discussed, along with identifying each primitive along each such path, other information pertinent to shading those primitives is retrieved to enable shading to be performed together with the coarse rasterization.

At 2140, outer conservative shading is performed on each primitive identified along a path of a shading image sample and identified as a visible primitive for each pixel of the shading image to derive a color value for each such primitive within that shading image pixel. At 2150, the color value of each primitive within each shading image pixel is assigned to one or more of the screen image samples that fall within that shading image pixel. As has been discussed, the screen image samples employed during the fine rasterization to identify the visible primitives are now used to transfer those color values to the screen image pixels. However, as also discussed, given that there may not be a one-to-one correspondence of size and/or alignment of boundaries between the shading image pixels and the screen image pixels, the screen image samples that fall within a single screen image pixel may also fall within multiple shading image pixels such that color values from multiple shading image pixels are transferred to at least a subset of the screen image pixels. To address this, at 2160, the color values of all of the screen image samples that fall within each screen image pixel are averaged to derive a single color value of that screen image pixel.

Figure 10:
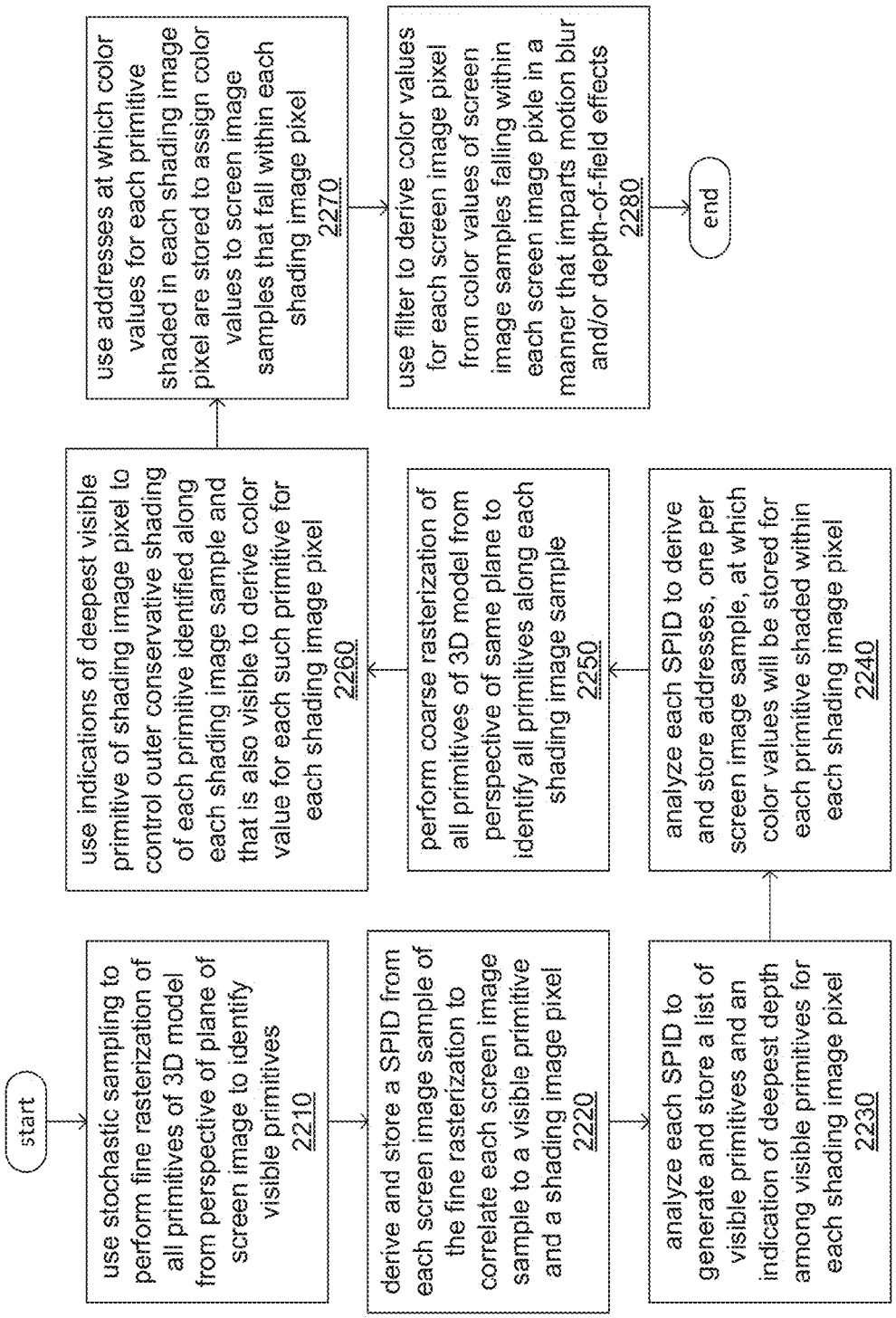

FIG. 10 illustrates one embodiment of a logic flow 2200. The logic flow 2200 may be representative of some or all of the operations executed by one or more embodiments described herein. More specifically, the logic flow 2200 may illustrate operations performed by the processor components 550 and/or 650 in executing at least the evaluation routine 640, and/or performed by other component(s) of the computing device 500.

At 2210, a processor component of a computing device (e.g., the processor component 550 and/or 650 of the computing device 500) employs stochastic sampling to perform fine rasterization of all graphics primitives of a 3D model (e.g., the primitives 282 of the 3D model 280) from the perspective of a plane of a 2D screen image (e.g., the screen image 880) to identify all of the primitives of the 3D model that are visible from that perspective (e.g., the visible primitives 882).

At 2220, each screen image sample of the fine rasterization (e.g., each screen image sample 888) is analyzed to generate a SPID that correlates the screen image sample to a primitive of the 3D model that was found via the screen image sample to be a visible primitive from the perspective of the screen image, and that correlates the screen image sample to a shading image pixel of a shading image (e.g., a shading image pixel 685 of the shading image 680) that corresponds to the screen image. As has been discussed, each SPID may also include an indication of the depth of the visible primitive at the shading image pixel to which the SPID correlates its associated screen image sample.

At 2230, each SPID is analyzed to generate, for each shading image pixel, a list of the visible primitives that are visible within the area of the shading image that is covered by that shading image pixel. Again, the lists for all of the shading image pixels (regardless of what data structure is employed to implement each) may be combined into a single larger data structure, such as an array of linked lists, etc. Each SPID may also be analyzed to generate and store indications of the deepest depth (e.g., greatest distance) at which any visible primitive is found within each shading image pixel. At 2240, each SPID may further be analyzed to derive and store addresses, one per screen image sample, at which a color value will be stored for a primitive shaded within a shading image pixel and from which the color value for that screen image sample will be assigned after shading is performed.

At 2250, the processor component performs coarse rasterization of all graphics primitives of the 3D model from the perspective of the same plane of the 2D screen image, but substituting the shading image, to identify all of the primitives of the 3D model that exist along the path of each shading image sample (e.g., a shading image sample 688). As has been discussed, along with identifying each primitive along each such path, other information pertinent to shading those primitives is retrieved to enable shading to be performed together with the coarse rasterization.

At 2260, the indications of the deepest depth reached by any visible primitive within each shading image pixel are employed to more efficiently identify which primitives identified along a path of a shading image sample and are also visible primitives for each pixel of the shading image as part of controlling performance of outer conservative shading to derive a color value for each such primitive within that shading image pixel. At 2270, the addresses derived and stored at 2240 may be used to assign a color value to each screen image sample as part of transferring the colors derived for each shading image pixel during the shading at 2260 to the screen image pixels via the screen image samples.

At 2280, a filter is employed to derive a color value for each screen image pixel from the color values of screen image samples falling within that screen image pixel to impart motion blur or depth-of-field effects. As has been discussed, some filters may include color values of screen image samples that fall within neighboring pixels along with the color value of the screen image samples that fall within the screen image pixel for which the color value is determined.

Figure 11:
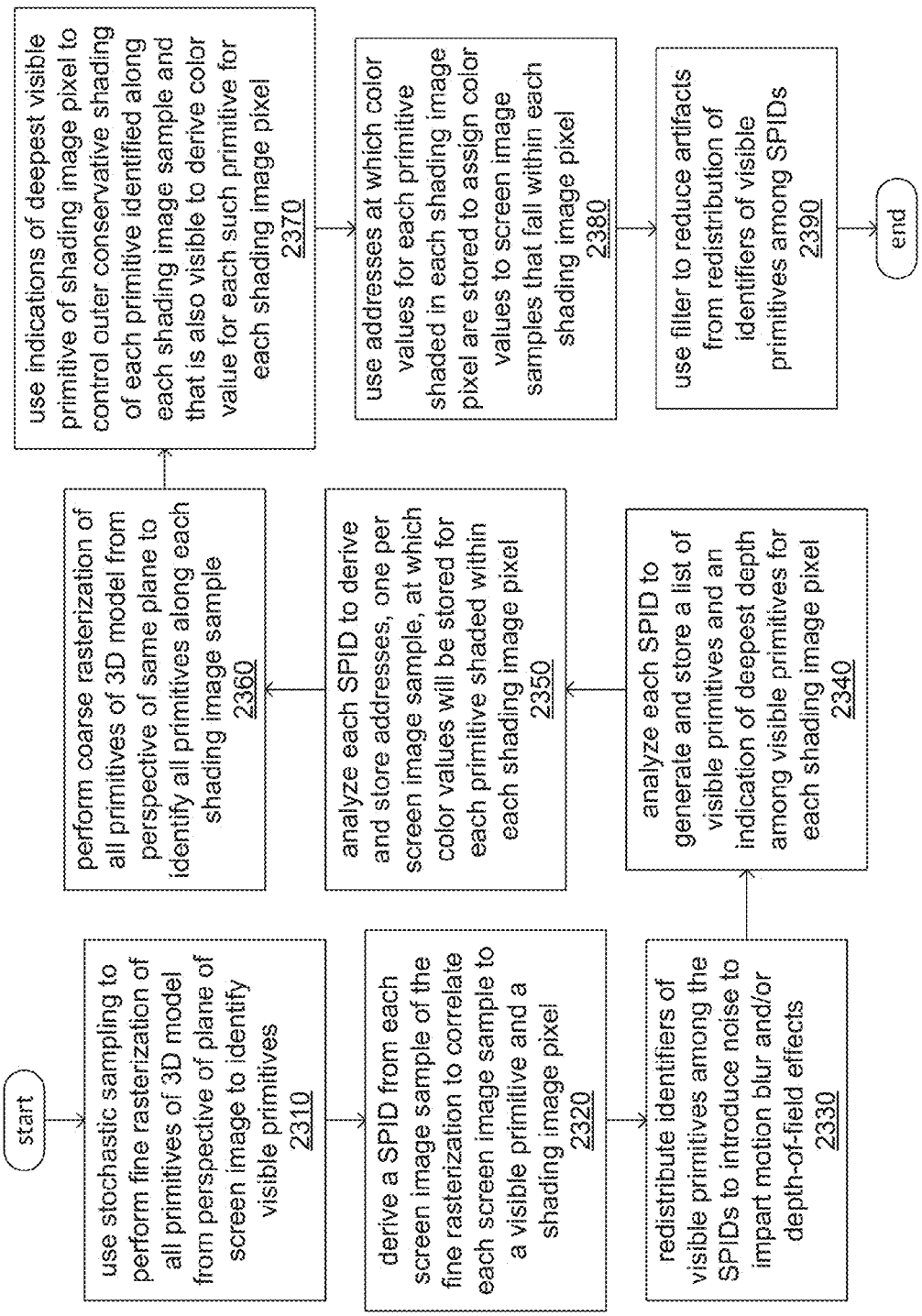

FIG. 11 illustrates one embodiment of a logic flow 2300. The logic flow 2300 may be representative of some or all of the operations executed by one or more embodiments described herein. More specifically, the logic flow 2300 may illustrate operations performed by the processor components 550 and/or 650 in executing at least the evaluation routine 640, and/or performed by other component(s) of the computing device 500.

At 2310, a processor component of a computing device (e.g., the processor component 550 and/or 650 of the computing device 500) employs stochastic sampling to perform fine rasterization of all graphics primitives of a 3D model (e.g., the primitives 282 of the 3D model 280) from the perspective of a plane of a 2D screen image (e.g., the screen image 880) to identify all of the primitives of the 3D model that are visible from that perspective (e.g., the visible primitives 882).

At 2320, each screen image sample of the fine rasterization (e.g., each screen image sample 888) is analyzed to generate a SPID that correlates the screen image sample to a primitive of the 3D model that was found via the screen image sample to be a visible primitive from the perspective of the screen image, and that correlates the screen image sample to a shading image pixel of a shading image (e.g., a shading image pixel 685 of the shading image 680) that corresponds to the screen image. As has been discussed, each SPID may also include an indication of the depth of the visible primitive at the shading image pixel to which the SPID correlates its associated screen image sample.

At 2330, identifiers of visible primitives may be redistributed among at least a subset of the SPIDs to impart motion blur and/or depth-of-field effects. As has been discussed, such redistribution may be limited to being performed among SPIDs associated only with screen image samples that fall within a single screen image pixel, or may be performed among SPIDs associated with screen image samples that fall within multiple adjacent screen image pixels.

At 2340, each SPID is analyzed to generate, for each shading image pixel, a list of the visible primitives that are visible within the area of the shading image that is covered by that shading image pixel. Again, the lists for all of the shading image pixels (regardless of what data structure is employed to implement each) may be combined into a single larger data structure, such as an array of linked lists, etc. Each SPID may also be analyzed to generate and store indications of the deepest depth (e.g., greatest distance) at which any visible primitive is found within each shading image pixel. At 2350, each SPID may further be analyzed to derive and store addresses, one per screen image sample, at which a color value will be stored for a primitive shaded within a shading image pixel and from which the color value for that screen image sample will be assigned after shading is performed.

At 2360, the processor component performs coarse rasterization of all graphics primitives of the 3D model from the perspective of the same plane of the 2D screen image, but substituting the shading image, to identify all of the primitives of the 3D model that exist along the path of each shading image sample (e.g., a shading image sample 688). As has been discussed, along with identifying each primitive along each such path, other information pertinent to shading those primitives is retrieved to enable shading to be performed together with the coarse rasterization.

At 2370, the indications of the deepest depth reached by any visible primitive within each shading image pixel are employed to more efficiently identify which primitives identified along a path of a shading image sample and are also visible primitives for each pixel of the shading image as part of controlling performance of outer conservative shading to derive a color value for each such primitive within that shading image pixel. At 2380, the addresses derived and stored at 2350 may be used to assign a color value to each screen image sample as part of transferring the colors derived for each shading image pixel during the shading at 2370 to the screen image pixels via the screen image samples.

At 2390, a filter is employed to reduce visual artifacts from the imparting of motion blur and/or depth-of-field effects during the generation of the SPIDs. As has been discussed, some filters may include color values of screen image samples that fall within neighboring pixels along with the color value of the screen image samples that fall within the screen image pixel for which the color value is determined.

Figure 12:
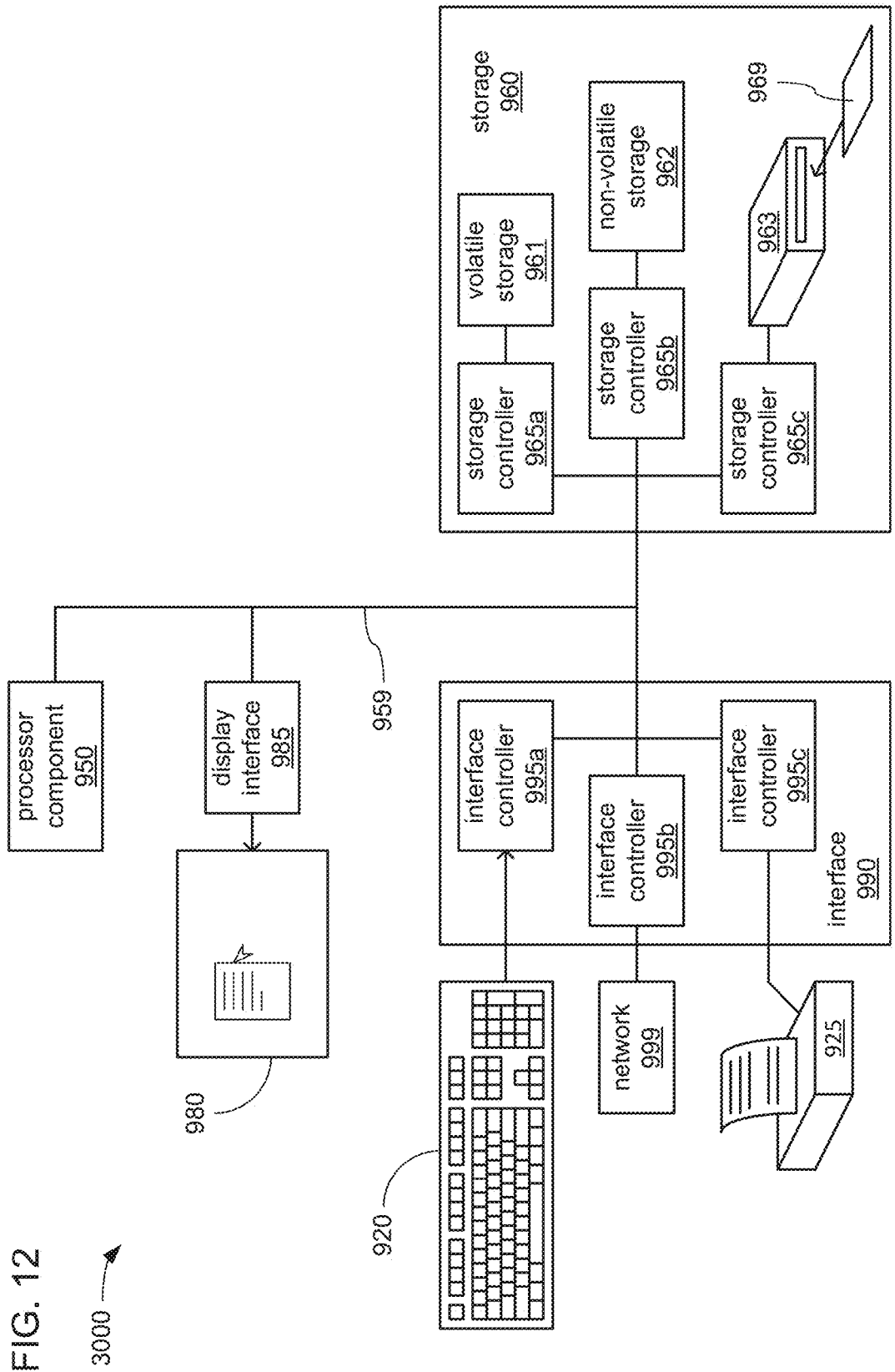
FIG. 12 illustrates a processing architecture according to an embodiment.

FIG. 12 illustrates an embodiment of an exemplary processing architecture 3000 suitable for implementing various embodiments as previously described. More specifically, the processing architecture 3000 (or variants thereof) may be implemented as part of one or more of the computing devices 300, 500 or 700, and/or as part of the controller 600. It should be noted that components of the processing architecture 3000 are given reference numbers in which the last two digits correspond to the last two digits of reference numbers of at least some of the components earlier depicted and described as part of the computing devices 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 550, 650 and 750) may include any of a wide variety of commercially available processors, employing any of a wide variety of technologies and implemented with one or more cores physically combined in any of a number of ways.

As previously discussed, the storage 960 (corresponding to the storages 560, 660 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 590 or 790) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Figure 13:
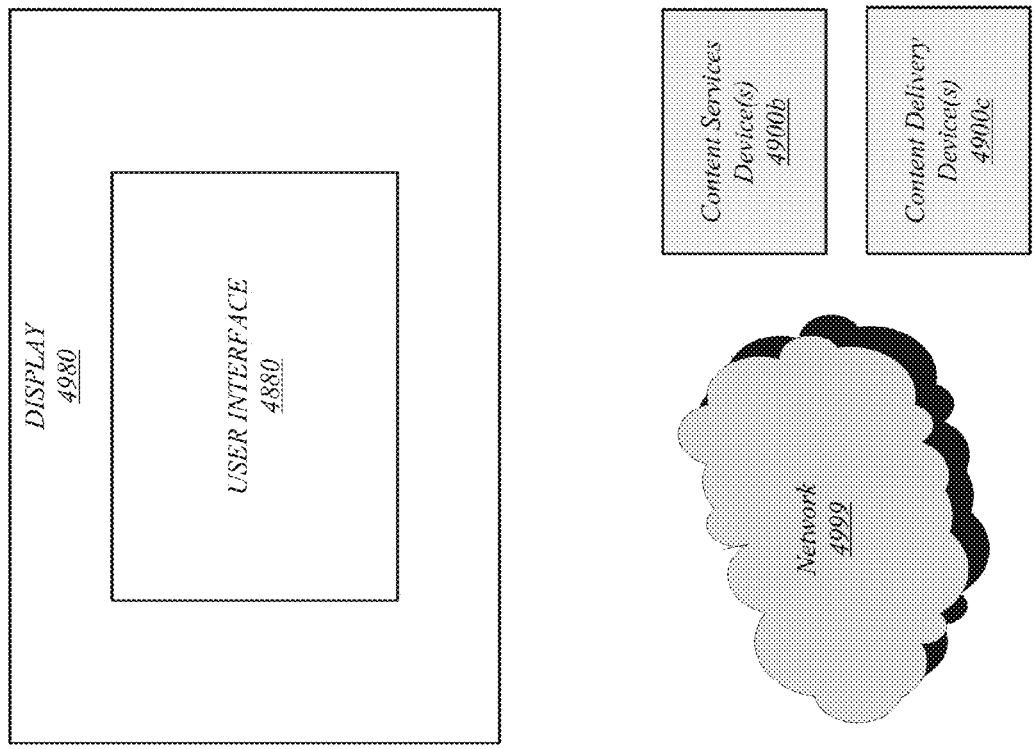
FIG. 13 illustrates another alternate embodiment of a graphics processing system.
Figure 13:
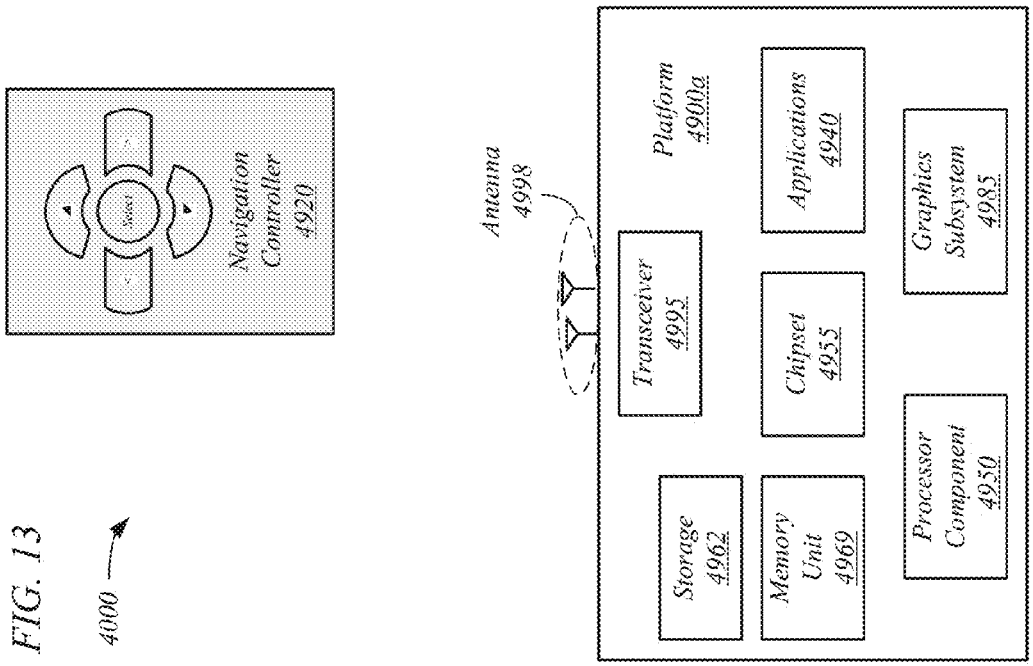

FIG. 13 illustrates an embodiment of a system 4000. In various embodiments, system 4000 may be representative of a system or architecture suitable for use with one or more embodiments described herein, such as the graphics rendering system 1000; one or more of the computing devices 300, 500 or 700; and/or one or more of the logic flows 2100 or 2200. The embodiments are not limited in this respect.

As shown, system 4000 may include multiple elements. One or more elements may be implemented using one or more circuits, components, registers, processors, software subroutines, modules, or any combination thereof, as desired for a given set of design or performance constraints. Although FIG. 13 shows a limited number of elements in a certain topology by way of example, it can be appreciated that more or less elements in any suitable topology may be used in system 4000 as desired for a given implementation. The embodiments are not limited in this context.

In embodiments, system 4000 may be a media system although system 4000 is not limited to this context. For example, system 4000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 4000 includes a platform 4900a coupled to a display 4980. Platform 4900a may receive content from a content device such as content services device(s) 4900c or content delivery device(s) 4900d or other similar content sources. A navigation controller 4920 including one or more navigation features may be used to interact with, for example, platform 4900a and/or display 4980. Each of these components is described in more detail below.

In embodiments, platform 4900a may include any combination of a processor component 4950, chipset 4955, memory unit 4969, transceiver 4995, storage 4962, applications 4940, and/or graphics subsystem 4985. Chipset 4955 may provide intercommunication among processor circuit 4950, memory unit 4969, transceiver 4995, storage 4962, applications 4940, and/or graphics subsystem 4985. For example, chipset 4955 may include a storage adapter (not depicted) capable of providing intercommunication with storage 4962.

Processor component 4950 may be implemented using any processor or logic device, and may be the same as or similar to one or more of processor components 550, 650 or 750, and/or to processor component 950 of FIG. 12.

Memory unit 4969 may be implemented using any machine-readable or computer-readable media capable of storing data, and may be the same as or similar to storage media 969 of FIG. 12.

Transceiver 4995 may include one or more radios capable of transmitting and receiving signals using various suitable wireless communications techniques, and may be the same as or similar to transceiver 995b in FIG. 12.

Display 4980 may include any television type monitor or display, and may be the same as or similar to one or more of displays 580 and 780, and/or to display 980 in FIG. 12.

Storage 4962 may be implemented as a non-volatile storage device, and may be the same as or similar to non-volatile storage 962 in FIG. 12.

Graphics subsystem 4985 may perform processing of images such as still or video for display. Graphics subsystem 4985 may be a graphics processing unit (GPU) or a visual processing unit (VPU), for example. An analog or digital interface may be used to communicatively couple graphics subsystem 4985 and display 4980. For example, the interface may be any of a High-Definition Multimedia Interface, DisplayPort, wireless HDMI, and/or wireless HD compliant techniques. Graphics subsystem 4985 could be integrated into processor circuit 4950 or chipset 4955. Graphics subsystem 4985 could be a stand-alone card communicatively coupled to chipset 4955.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 4900b may be hosted by any national, international and/or independent service and thus accessible to platform 4900a via the Internet, for example. Content services device(s) 4900b may be coupled to platform 4900a and/or to display 4980. Platform 4900a and/or content services device(s) 4900b may be coupled to a network 4999 to communicate (e.g., send and/or receive) media information to and from network 4999. Content delivery device(s) 4900c also may be coupled to platform 4900a and/or to display 4980.

In embodiments, content services device(s) 4900b may include a cable television box, personal computer, network, telephone, Internet enabled devices or appliance capable of delivering digital information and/or content, and any other similar device capable of unidirectionally or bidirectionally communicating content between content providers and platform 4900a and/display 4980, via network 4999 or directly. It will be appreciated that the content may be communicated unidirectionally and/or bidirectionally to and from any one of the components in system 4000 and a content provider via network 4999. Examples of content may include any media information including, for example, video, music, medical and gaming information, and so forth.

Content services device(s) 4900b receives content such as cable television programming including media information, digital information, and/or other content. Examples of content providers may include any cable or satellite television or radio or Internet content providers. The provided examples are not meant to limit embodiments.

In embodiments, platform 4900a may receive control signals from navigation controller 4920 having one or more navigation features. The navigation features of navigation controller 4920 may be used to interact with a user interface 4880, for example. In embodiments, navigation controller 4920 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 4920 may be echoed on a display (e.g., display 4980) by movements of a pointer, cursor, focus ring, or other visual indicators displayed on the display. For example, under the control of software applications 4940, the navigation features located on navigation controller 4920 may be mapped to virtual navigation features displayed on user interface 4880. In embodiments, navigation controller 4920 may not be a separate component but integrated into platform 4900a and/or display 4980. Embodiments, however, are not limited to the elements or in the context shown or described herein.

In embodiments, drivers (not shown) may include technology to enable users to instantly turn on and off platform 4900a like a television with the touch of a button after initial boot-up, when enabled, for example. Program logic may allow platform 4900a to stream content to media adaptors or other content services device(s) 4900b or content delivery device(s) 4900c when the platform is turned "off." In addition, chip set 4955 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 4000 may be integrated. For example, platform 4900a and content services device(s) 4900b may be integrated, or platform 4900a and content delivery device(s) 4900c may be integrated, or platform 4900a, content services device(s) 4900b, and content delivery device(s) 4900c may be integrated, for example. In various embodiments, platform 4900a and display 4890 may be an integrated unit. Display 4980 and content service device(s) 4900b may be integrated, or display 4980 and content delivery device(s) 4900c may be integrated, for example. These examples are not meant to limit embodiments.

In various embodiments, system 4000 may be implemented as a wireless system, a wired system, or a combination of both. When implemented as a wireless system, system 4000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 4900a may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
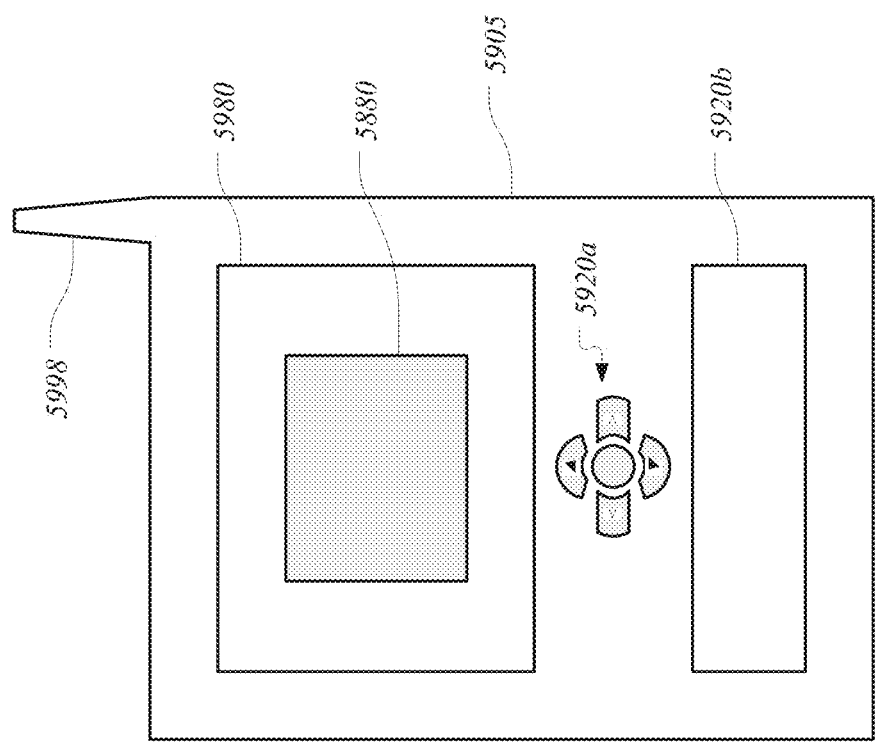
FIG. 14 illustrates an embodiment of a device.

As described above, system 4000 may be embodied in varying physical styles or form factors. FIG. 14 illustrates embodiments of a small form factor device 5000 in which system 4000 may be embodied. In embodiments, for example, device 5000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 5000 may include a display 5980, a navigation controller 5920a, a user interface 5880, a housing 5905, an I/O device 5920b, and an antenna 5998. Display 5980 may include any suitable display unit for displaying information appropriate for a mobile computing device, and may be the same as or similar to display 4980 in FIG. 13. Navigation controller 5920a may include one or more navigation features which may be used to interact with user interface 5880, and may be the same as or similar to navigation controller 4920 in FIG. 13. I/O device 5920b may include any suitable I/O device for entering information into a mobile computing device. Examples for I/O device 5920b may include an alphanumeric keyboard, a numeric keypad, a touch pad, input keys, buttons, switches, rocker switches, microphones, speakers, voice recognition device and software, and so forth. Information also may be entered into device 5000 by way of a microphone. Such information may be digitized by a voice recognition device. The embodiments are not limited in this context.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, a device to render two-dimensional (2D) imagery from three-dimensional (3D) model data includes a fine rasterizing component to employ multiple screen image samples per screen image pixel of a screen image to perform fine rasterization of a 3D model to identify a set of visible primitives of the 3D model that are visible from a perspective of the screen image, a coarse rasterizing component to employ a single shading image sample per shading image pixel of a shading image that corresponds to the screen image to perform coarse rasterization of the 3D model from the perspective of the screen image to identify at least one primitive along a path of a shading image pixel, and a shading component to shade a primitive identified by a screen image sample of a first screen image pixel as visible within the shading image pixel and identified as along the path of the shading image sample associated with the shading image pixel to derive a first color value.

In Example 2, which includes the subject matter of Example 1, the device may include a resolving component to assign the first color value to each screen image sample of a first set of screen image samples of the 3D model that falls within the shading image pixel; and a sample averaging component to average color values of a second set of screen image samples of the 3D model that falls within the first screen image pixel to determine a second color value of the first screen image pixel, the first screen image pixel at least partially coinciding with the shading image pixel, and the second set of screen image samples differing from and sharing at least one screen image sample with the first set of screen image samples.

In Example 3, which includes the subject matter of any of Examples 1-2, the fine rasterizing component may generate a multitude of shading point identifiers (SPIDs) to correlate a multitude of screen image samples including the first and second sets of screen image samples to a multitude of shading image pixels of the shading image, each SPID of the multitude of SPIDs associated with a screen image sample of a multitude of screen image samples, and each SPID to correlate a visible primitive of the set of visible primitives to a shading image pixel of the multitude of shading image pixels.

In Example 4, which includes the subject matter of any of Examples 1-3, each SPID of the multitude of SPIDs may include an identifier assigned to a visible primitive of the set of visible primitives, coordinates of a shading image pixel of the multitude shading image pixels in which the screen image sample associated with the SPID falls, and an indication of a depth of the visible primitive within the shading image pixel associated with the coordinates.

In Example 5, which includes the subject matter of any of Examples 1-4, the fine rasterizing component may redistribute identifiers among at least a subset of the SPIDs of the multitude of SPIDs to impart at least one of a motion blur effect or a depth-of-field effect.

In Example 6, which includes the subject matter of any of Examples 1-5, the device may include a shading constraint component to generate from the multitude of SPIDs a set of lists of visible primitives of the set of visible primitives, each list of the set of lists associated with a shading image pixel of the multitude of shading image pixels, and each list including at least one identifier of at least one visible primitive of the set of visible primitives that is visible within the shading image pixel associated with the list and an indication of a depth of the at least one visible primitive within the shading image pixel.

In Example 7, which includes the subject matter of any of Examples 1-6, each list of the set of lists may include a linked list, and the set of lists including an array of the lists.

In Example 8, which includes the subject matter of any of Examples 1-7, the shading component may compare an identifier of the at least one primitive to the at least one identifier of a list of the set of lists associated with a single shading image pixel to determine whether to shade the at least one primitive in the single shading image pixel.

In Example 9, which includes the subject matter of any of Examples 1-8, the shading constraint component may determine from the multitude of SPIDs a greatest depth reached by any visible primitive of the set of visible primitives that is visible in each shading image pixel of the multitude of shading image pixels.

In Example 10, which includes the subject matter of any of Examples 1-9, the shading component may compare a depth of the at least one primitive to a greatest depth reached by any visible primitive that is visible within a single shading image pixel to determine whether to shade the at least one primitive within the single shading image pixel.

In Example 11, which includes the subject matter of any of Examples 1-10, the device may include a filtering component to include a color value associated with a second screen image pixel adjacent the first screen image pixel in the screen image in the determination of the second color value to impart at least one of a motion blur effect or a depth-of-field effect to at least one object depicted in the screen image.

In Example 12, which includes the subject matter of any of Examples 1-11, the fine rasterizing component may employ at least one of supersampling, multisampling, stochastic sampling, stochastic sampling over a time dimension, stochastic sampling over a lens dimension or ray tracing.

In Example 13, which includes the subject matter of any of Examples 1-12, the device may include a display to present the screen image.

In Example 14, which includes the subject matter of any of Examples 1-13, the device may include an interface to transmit screen image data representing the screen image to another device.

In Example 15, which includes the subject matter of any of Examples 1-14, the fine rasterizing component may set a pixel resolution of the screen image to a pixel resolution of a display.

In Example 16, a device to render two-dimensional (2D) imagery from three-dimensional (3D) model data includes a shading component to shade a primitive visible within a shading image pixel of a shading image that corresponds to a screen image to determine a first color value of the shading image pixel; a resolving component to assign the first color value to each screen image sample of a first set of screen image samples of a 3D model that falls within the shading image pixel; and a sample averaging component to average color values of a second set of screen image samples of the 3D model that falls within a first screen image pixel of the screen image to determine a second color value of the first screen image pixel, the first screen image pixel at least partially coinciding with the shading image pixel, and the second set of screen image samples differing from and sharing at least one screen image sample with the first set of screen image samples.

In Example 17, which includes the subject matter of Example 16, the device may include a fine rasterizing component to employ a multitude of screen image samples to rasterize the 3D model to identify a set of visible primitives of the 3D model that are visible from a perspective of the screen image and to generate a multitude of shading point identifiers (SPIDs) to correlate the multitude of screen image samples to a multitude of shading image pixels of the shading image, each SPID of the multitude of SPIDs associated with a screen image sample of the multitude of screen image samples that includes the first and second sets of screen image samples, and each SPID to correlate a visible primitive of the set of visible primitives to a shading image pixel of the multitude of shading image pixels.

In Example 18, which includes the subject matter of any of Examples 16-17, each SPID of the multitude of SPIDs may include an identifier assigned to a visible primitive of the set of visible primitives, coordinates of a shading image pixel of the multitude shading image pixels in which the screen image sample associated with the SPID falls, and an indication of a depth of the visible primitive within the shading image pixel associated with the coordinates.

In Example 19, which includes the subject matter of any of Examples 16-18, the fine rasterizing component may redistribute identifiers among at least a subset of the SPIDs of the multitude of SPIDs to impart at least one of a motion blur effect or a depth-of-field effect.

In Example 20, which includes the subject matter of any of Examples 16-19, the device may include a shading constraint component to generate from the multitude of SPIDs a set of lists of visible primitives of the set of visible primitives, each list of the set of lists associated with a shading image pixel of the multitude of shading image pixels, and each list including at least one identifier of at least one visible primitive of the set of visible primitives that is visible within the shading image pixel associated with the list and an indication of a depth of the at least one visible primitive within the shading image pixel.

In Example 21, which includes the subject matter of any of Examples 16-20, each list of the set of lists may include a linked list, and the set of lists including an array of the lists.

In Example 22, which includes the subject matter of any of Examples 16-21, the device may include a coarse shading component to employ a single shading image sample associated with a single shading image pixel of the multitude of shading image pixels to identify at least one primitive of the 3D model that exists along a path of the single shading image sample through the 3D model, the shading component to compare an identifier of the at least one primitive to the at least one identifier of a list of the set of lists associated with the single shading image pixel to determine whether to shade the at least one primitive in the single shading image pixel.

In Example 23, which includes the subject matter of any of Examples 16-22, the shading constraint component may determine from the multitude of SPIDs a greatest depth reached by any visible primitive of the set of visible primitives that is visible in each shading image pixel of the multitude of shading image pixels.

In Example 24, which includes the subject matter of any of Examples 16-23, the device may include a coarse shading component to employ a single shading image sample associated with a single shading image pixel of the multitude of shading image pixels to identify at least one primitive of the 3D model that exists along a path of the single shading image sample through the 3D model, the shading component to compare a depth of the at least one primitive to a greatest depth reached by any visible primitive that is visible within a single shading image pixel to determine whether to shade the at least one primitive within the single shading image pixel.

In Example 25, which includes the subject matter of any of Examples 16-24, the device may include a filtering component to include a color value associated with a second screen image pixel adjacent the first screen image pixel in the screen image in the determination of the second color value to impart at least one of a motion blur effect or a depth-of-field effect to at least one object depicted in the screen image.

In Example 26, which includes the subject matter of any of Examples 16-25, the fine rasterizing component may employ at least one of supersampling, multisampling, stochastic sampling, stochastic sampling over a time dimension, stochastic sampling over a lens dimension or ray tracing.

In Example 27, which includes the subject matter of any of Examples 16-26, the device may include a display to present the screen image, the fine rasterizing component to set a pixel resolution of the screen image to a pixel resolution of the display.

In Example 28, which includes the subject matter of any of Examples 16-27, the device may include a display to present the screen image.

In Example 29, which includes the subject matter of any of Examples 16-28, the device may include an interface to transmit screen image data representing the screen image to another device.

In Example 30, which includes the subject matter of any of Examples 16-29, the device may include a fine rasterizing component to set a pixel resolution of the screen image to a pixel resolution of a display.

In Example 31, a computing-implemented method for rendering two-dimensional (2D) imagery from three-dimensional (3D) model data includes
employing multiple screen image samples per screen image pixel of a screen image to perform fine rasterization of a 3D model to identify a set of visible primitives of the 3D model that are visible from a perspective of the screen image;
employing a single shading image sample per shading image pixel of a shading image that corresponds to the screen image to perform coarse rasterization of the 3D model from the perspective of the screen image to identify at least one primitive along a path of a shading image pixel; and
shading a primitive identified by a screen image sample of a first screen image pixel as visible within the shading image pixel and identified as along the path of the shading image sample associated with the shading image pixel to derive a first color value.

In Example 32, which includes the subject matter of Example 31, the method may include assigning the first color value to each screen image sample of a first set of screen image samples of the 3D model that falls within the shading image pixel; and averaging color values of a second set of screen image samples of the 3D model that falls within the first screen image pixel to determine a second color value of the first screen image pixel, the first screen image pixel at least partially coinciding with the shading image pixel, and the second set of screen image samples differing from and sharing at least one screen image sample with the first set of screen image samples.

In Example 33, which includes the subject matter of any of Examples 31-32, the method may include generating a multitude of shading point identifiers (SPIDs) to correlate a multitude of screen image samples including the first and second sets of screen image samples to a multitude of shading image pixels of the shading image, each SPID of the multitude of SPIDs associated with a screen image sample of a multitude of screen image samples, and each SPID to correlate a visible primitive of the set of visible primitives to a shading image pixel of the multitude of shading image pixels.

In Example 34, which includes the subject matter of any of Examples 31-33, the method may include an identifier assigned to a visible primitive of the set of visible primitives, coordinates of a shading image pixel of the multitude shading image pixels in which the screen image sample associated with the SPID falls, and an indication of a depth of the visible primitive within the shading image pixel associated with the coordinates.

In Example 35, which includes the subject matter of any of Examples 31-34, the method may include redistributing identifiers among at least a subset of the SPIDs of the multitude of SPIDs to impart at least one of a motion blur effect or a depth-of-field effect.

In Example 36, which includes the subject matter of any of Examples 31-35, the method may include generating from the multitude of SPIDs a set of lists of visible primitives of the set of visible primitives, each list of the set of lists associated with a shading image pixel of the multitude of shading image pixels, and each list including at least one identifier of at least one visible primitive of the set of visible primitives that is visible within the shading image pixel associated with the list and an indication of a depth of the at least one visible primitive within the shading image pixel.

In Example 37, which includes the subject matter of any of Examples 31-36, each list of the set of lists may include a linked list, and the set of lists including an array of the lists.

In Example 38, which includes the subject matter of any of Examples 31-37, the method may include comparing an identifier of the at least one primitive to the at least one identifier of a list of the set of lists associated with a single shading image pixel to determine whether to shade the at least one primitive in the single shading image pixel.

In Example 39, which includes the subject matter of any of Examples 31-38, the method may include determining from the multitude of SPIDs a greatest depth reached by any visible primitive of the set of visible primitives that is visible in each shading image pixel of the multitude of shading image pixels.

In Example 40, which includes the subject matter of any of Examples 31-39, the method may include comparing a depth of the at least one primitive to a greatest depth reached by any visible primitive that is visible within a single shading image pixel to determine whether to shade the at least one primitive within the single shading image pixel.

In Example 41, which includes the subject matter of any of Examples 31-40, the method may include including a color value associated with a second screen image pixel adjacent the first screen image pixel in the screen image in determining the second color value to impart at least one of a motion blur effect or a depth-of-field effect to at least one object depicted in the screen image.

In Example 42, which includes the subject matter of any of Examples 31-41, the method may include employing at least one of supersampling, multisampling, stochastic sampling, stochastic sampling over a time dimension, stochastic sampling over a lens dimension or ray tracing.

In Example 43, which includes the subject matter of any of Examples 31-42, the method may include presenting the screen image on a display.

In Example 44, which includes the subject matter of any of Examples 31-43, the method may include transmitting screen image data representing the screen image to another device.

In Example 45, which includes the subject matter of any of Examples 31-44, the method may include setting a pixel resolution of the screen image to a pixel resolution of a display.

In Example 46, a computing-implemented method for rendering two-dimensional (2D) imagery from three-dimensional (3D) model data includes shading a primitive visible within a shading image pixel of a shading image that corresponds to a screen image to determine a first color value of the shading image pixel; assigning the first color value to each screen image sample of a first set of screen image samples of a 3D model that falls within the shading image pixel; and averaging color values of a second set of screen image samples of the 3D model that falls within a first screen image pixel of the screen image to determine a second color value of the first screen image pixel, the first screen image pixel at least partially coinciding with the shading image pixel, and the second set of screen image samples differing from and sharing at least one screen image sample with the first set of screen image samples.

In Example 47, which includes the subject matter of Example 46, the method may include employing a multitude of screen image samples to rasterize the 3D model to identify a set of visible primitives of the 3D model that are visible from a perspective of the screen image and to generate a multitude of shading point identifiers (SPIDs) to correlate the multitude of screen image samples to a multitude of shading image pixels of the shading image, each SPID of the multitude of SPIDs associated with a screen image sample of the multitude of screen image samples that includes the first and second sets of screen image samples, and each SPID to correlate a visible primitive of the set of visible primitives to a shading image pixel of the multitude of shading image pixels.

In Example 48, which includes the subject matter of any of Examples 46-47, each SPID of the multitude of SPIDs may include an identifier assigned to a visible primitive of the set of visible primitives, coordinates of a shading image pixel of the multitude shading image pixels in which the screen image sample associated with the SPID falls, and an indication of a depth of the visible primitive within the shading image pixel associated with the coordinates.

In Example 49, which includes the subject matter of any of Examples 46-48, the method may include redistributing identifiers among at least a subset of the SPIDs of the multitude of SPIDs to impart at least one of a motion blur effect or a depth-of-field effect.

In Example 50, which includes the subject matter of any of Examples 46-49, the method may include generating from the multitude of SPIDs a set of lists of visible primitives of the set of visible primitives, each list of the set of lists associated with a shading image pixel of the multitude of shading image pixels, and each list including at least one identifier of at least one visible primitive of the set of visible primitives that is visible within the shading image pixel associated with the list and an indication of a depth of the at least one visible primitive within the shading image pixel.

In Example 51, which includes the subject matter of any of Examples 46-50, each list of the set of lists may include a linked list, and the set of lists including an array of the lists.

In Example 52, which includes the subject matter of any of Examples 46-51, the method may include employing a single shading image sample associated with a single shading image pixel of the multitude of shading image pixels to identify at least one primitive of the 3D model that exists along a path of the single shading image sample through the 3D model, and comparing an identifier of the at least one primitive to the at least one identifier of a list of the set of lists associated with the single shading image pixel to determine whether to shade the at least one primitive in the single shading image pixel.

In Example 53, which includes the subject matter of any of Examples 46-52, the method may include determining from the multitude of SPIDs a greatest depth reached by any visible primitive of the set of visible primitives that is visible in each shading image pixel of the multitude of shading image pixels.

In Example 54, which includes the subject matter of any of Examples 46-53, the method may include employing a single shading image sample associated with a single shading image pixel of the multitude of shading image pixels to identify at least one primitive of the 3D model that exists along a path of the single shading image sample through the 3D model, and comparing a depth of the at least one primitive to a greatest depth reached by any visible primitive that is visible within a single shading image pixel to determine whether to shade the at least one primitive within the single shading image pixel.

In Example 55, which includes the subject matter of any of Examples 46-54, the method may include including a color value associated with a second screen image pixel adjacent the first screen image pixel in the screen image in the determination of the second color value to impart at least one of a motion blur effect or a depth-of-field effect to at least one object depicted in the screen image.

In Example 56, which includes the subject matter of any of Examples 46-55, the method may include employing the multitude of screen image samples to rasterize the 3D model includes employing at least one of supersampling, multisampling, stochastic sampling, stochastic sampling over a time dimension, stochastic sampling over a lens dimension or ray tracing.

In Example 57, which includes the subject matter of any of Examples 46-56, the method may include presenting the screen image on a display.

In Example 58, which includes the subject matter of any of Examples 46-57, the method may include setting a pixel resolution of the screen image to a pixel resolution of the display.

In Example 59, which includes the subject matter of any of Examples 46-58, the method may include transmitting a screen image data representing the screen image to another device via a network.

In Example 60, which includes the subject matter of any of Examples 46-59, the method may include setting a pixel resolution of the screen image to a pixel resolution of a display of the other device.

In Example 61, at least one machine-readable storage medium includes instructions that when executed by a computing device, cause the computing device to employ multiple screen image samples per screen image pixel of a screen image to perform fine rasterization of a 3D model to identify a set of visible primitives of the 3D model that are visible from a perspective of the screen image, employ a single shading image sample per shading image pixel of a shading image that corresponds to the screen image to perform coarse rasterization of the 3D model from the perspective of the screen image to identify at least one primitive along a path of a shading image pixel, and shade a primitive identified by a screen image sample of a first screen image pixel as visible within the shading image pixel and identified as along the path of the shading image sample associated with the shading image pixel to derive a first color value.

In Example 62, which includes the subject matter of Example 61, the computing device may be caused to assign the first color value to each screen image sample of a first set of screen image samples of the 3D model that falls within the shading image pixel; and average color values of a second set of screen image samples of the 3D model that falls within the first screen image pixel to determine a second color value of the first screen image pixel, the first screen image pixel at least partially coinciding with the shading image pixel, and the second set of screen image samples differing from and sharing at least one screen image sample with the first set of screen image samples.

In Example 63, which includes the subject matter of any of Examples 61-62, the computing device may be caused to generate a multitude of shading point identifiers (SPIDs) to correlate a multitude of screen image samples including the first and second sets of screen image samples to a multitude of shading image pixels of the shading image, each SPID of the multitude of SPIDs associated with a screen image sample of a multitude of screen image samples, and each SPID to correlate a visible primitive of the set of visible primitives to a shading image pixel of the multitude of shading image pixels.

In Example 64, which includes the subject matter of any of Examples 61-63, each SPID of the multitude of SPIDs may include an identifier assigned to a visible primitive of the set of visible primitives, coordinates of a shading image pixel of the multitude shading image pixels in which the screen image sample associated with the SPID falls, and an indication of a depth of the visible primitive within the shading image pixel associated with the coordinates.

In Example 65, which includes the subject matter of any of Examples 61-64, the computing device may be caused to redistribute identifiers among at least a subset of the SPIDs of the multitude of SPIDs to impart at least one of a motion blur effect or a depth-of-field effect.

In Example 66, which includes the subject matter of any of Examples 61-65, the computing device may be caused to generate from the multitude of SPIDs a set of lists of visible primitives of the set of visible primitives, each list of the set of lists associated with a shading image pixel of the multitude of shading image pixels, and each list including at least one identifier of at least one visible primitive of the set of visible primitives that is visible within the shading image pixel associated with the list and an indication of a depth of the at least one visible primitive within the shading image pixel.

In Example 67, which includes the subject matter of any of Examples 61-66, each list of the set of lists may include a linked list, and the set of lists may include an array of the lists.

In Example 68, which includes the subject matter of any of Examples 61-67, the computing device may be caused to In Example 69, which includes the subject matter of any of Examples 61-68, the computing device may be caused to compare an identifier of the at least one primitive to the at least one identifier of a list of the set of lists associated with a single shading image pixel to determine whether to shade the at least one primitive in the single shading image pixel.

In Example 70, which includes the subject matter of any of Examples 61-69, the computing device may be caused to compare a depth of the at least one primitive to a greatest depth reached by any visible primitive that is visible within a single shading image pixel to determine whether to shade the at least one primitive within the single shading image pixel.

In Example 71, which includes the subject matter of any of Examples 61-70, the computing device may be caused to include a color value associated with a second screen image pixel adjacent the first screen image pixel in the screen image in determining the second color value to impart at least one of a motion blur effect or a depth-of-field effect to at least one object depicted in the screen image.

In Example 72, which includes the subject matter of any of Examples 61-71, the computing device may be caused to employ at least one of supersampling, multisampling, stochastic sampling, stochastic sampling over a time dimension, stochastic sampling over a lens dimension or ray tracing.

In Example 73, which includes the subject matter of any of Examples 61-72, the computing device may be caused to present the screen image on a display.

In Example 74, which includes the subject matter of any of Examples 61-73, the computing device may be caused to transmit screen image data representing the screen image to another device.

In Example 75, which includes the subject matter of any of Examples 61-74, the computing device may be caused to set a pixel resolution of the screen image to a pixel resolution of a display.

In Example 76, at least one machine-readable storage medium includes instructions that when executed by a computing device, cause the computing device to shade a primitive visible within a shading image pixel of a shading image that corresponds to a screen image to determine a first color value of the shading image pixel; assign the first color value to each screen image sample of a first set of screen image samples of a 3D model that falls within the shading image pixel; and average color values of a second set of screen image samples of the 3D model that falls within a first screen image pixel of the screen image to determine a second color value of the first screen image pixel, the first screen image pixel at least partially coinciding with the shading image pixel, and the second set of screen image samples differing from and sharing at least one screen image sample with the first set of screen image samples.

In Example 77, which includes the subject matter of Example 76, the computing device may be caused to employ a multitude of screen image samples to rasterize the 3D model to identify a set of visible primitives of the 3D model that are visible from a perspective of the screen image and to generate a multitude of shading point identifiers (SPIDs) to correlate the multitude of screen image samples to a multitude of shading image pixels of the shading image, each SPID of the multitude of SPIDs associated with a screen image sample of the multitude of screen image samples that includes the first and second sets of screen image samples, and each SPID to correlate a visible primitive of the set of visible primitives to a shading image pixel of the multitude of shading image pixels.

In Example 78, which includes the subject matter of any of Examples 76-77, each SPID of the multitude of SPIDs may include an identifier assigned to a visible primitive of the set of visible primitives, coordinates of a shading image pixel of the multitude shading image pixels in which the screen image sample associated with the SPID falls, and an indication of a depth of the visible primitive within the shading image pixel associated with the coordinates.

In Example 79, which includes the subject matter of any of Examples 76-78, the computing device may be caused to redistribute identifiers among at least a subset of the SPIDs of the multitude of SPIDs to impart at least one of a motion blur effect or a depth-of-field effect.

In Example 80, which includes the subject matter of any of Examples 76-79, the computing device may be caused to generate from the multitude of SPIDs a set of lists of visible primitives of the set of visible primitives, each list of the set of lists associated with a shading image pixel of the multitude of shading image pixels, and each list including at least one identifier of at least one visible primitive of the set of visible primitives that is visible within the shading image pixel associated with the list and an indication of a depth of the at least one visible primitive within the shading image pixel.

In Example 81, which includes the subject matter of any of Examples 76-80, each list of the set of lists may include a linked list, and the set of lists may include an array of the lists.

In Example 82, which includes the subject matter of any of Examples 76-81, the computing device may be caused to employ a single shading image sample associated with a single shading image pixel of the multitude of shading image pixels to identify at least one primitive of the 3D model that exists along a path of the single shading image sample through the 3D model, and compare an identifier of the at least one primitive to the at least one identifier of a list of the set of lists associated with the single shading image pixel to determine whether to shade the at least one primitive in the single shading image pixel.

In Example 83, which includes the subject matter of any of Examples 76-82, the computing device may be caused to determine from the multitude of SPIDs a greatest depth reached by any visible primitive of the set of visible primitives that is visible in each shading image pixel of the multitude of shading image pixels.

In Example 84, which includes the subject matter of any of Examples 76-83, the computing device may be caused to employ a single shading image sample associated with a single shading image pixel of the multitude of shading image pixels to identify at least one primitive of the 3D model that exists along a path of the single shading image sample through the 3D model, and compare a depth of the at least one primitive to a greatest depth reached by any visible primitive that is visible within a single shading image pixel to determine whether to shade the at least one primitive within the single shading image pixel.

In Example 85, which includes the subject matter of any of Examples 76-84, the computing device may be caused to include a color value associated with a second screen image pixel adjacent the first screen image pixel in the screen image in the determination of the second color value to impart at least one of a motion blur effect or a depth-of-field effect to at least one object depicted in the screen image.

In Example 86, which includes the subject matter of any of Examples 76-85, to employ the multitude of screen image samples to rasterize the 3D model the computing device may be caused to employ at least one of supersampling, multisampling, stochastic sampling, stochastic sampling over a time dimension, stochastic sampling over a lens dimension or ray tracing.

In Example 87, which includes the subject matter of any of Examples 76-86, the computing device may be caused to present the screen image on a display of the computing device.

In Example 88, which includes the subject matter of any of Examples 76-87, the computing device may be caused to set a pixel resolution of the screen image to a pixel resolution of the display.

In Example 89, which includes the subject matter of any of Examples 76-88, the computing device may be caused to transmit a screen image data representing the screen image to another device via a network coupled to the computing device.

In Example 90, which includes the subject matter of any of Examples 76-89, the computing device may be caused to set a pixel resolution of the screen image to a pixel resolution of a display of the other device.

The invention claimed is:

1. A device to render two-dimensional (2D) imagery from three-dimensional (3D) model data comprising:
   a processor circuit;
   a fine rasterizing component for execution on the processor circuit to employ multiple screen image samples per screen image pixel of a screen image to perform fine rasterization of a 3D model to identify a set of visible primitives of the 3D model that are visible from a perspective of the screen image;
   a coarse rasterizing component for execution on the processor circuit to employ a single shading image sample per shading image pixel of a shading image that corresponds to the screen image to perform coarse rasterization of the 3D model from the perspective of the screen image to identify at least one primitive along a path of a shading image sample associated with a shading image pixel; and
   a shading component for execution on the processor circuit to determine whether each of the at least one primitives identified as along the path of the shading image sample are identified as a visible primitive in the set of visible primitives and shade each of the at least one primitives identified as along the path of the shading image sample and identified as a visible primitive in the set of visible primitives to derive a first color value for the shading image pixel associated with the shading image sample.

2. The device of claim 1, the fine rasterizing component to generate a multitude of shading point identifiers (SPIDs) to correlate a multitude of screen image samples comprising first and second sets of screen image samples to a multitude of shading image pixels of the shading image, each SPID of the multitude of SPIDs associated with a screen image sample of the multitude of screen image samples, and each SPID to correlate a visible primitive of the set of visible primitives to a respective shading image pixel of the multitude of shading image pixels.

3. The device of claim 2, each SPID of the multitude of SPIDs comprising:
   an identifier assigned to a visible primitive of the set of visible primitives;
   coordinates of a shading image pixel of the multitude shading image pixels in which the screen image sample associated with the SPID falls; and
   an indication of a depth of the visible primitive within the shading image pixel associated with the coordinates.

4. The device of claim 3, comprising a shading constraint component to generate from the multitude of SPIDs a set of lists of visible primitives of the set of visible primitives, each list of the set of lists associated with a shading image pixel of the multitude of shading image pixels, and each list comprising at least one identifier of at least one visible primitive of the set of visible primitives that is visible within the shading image pixel associated with the list and an indication of a depth of the at least one visible primitive within the shading image pixel.

5. The device of claim 4, the shading component to compare an identifier of the at least one primitive to the at least one identifier of a list of the set of lists associated with a single shading image pixel to determine whether to shade the at least one primitive in the single shading image pixel.

6. The device of claim 1, the fine rasterizing component to employ at least one of supersampling, multisampling, stochastic sampling, stochastic sampling over a time dimension, stochastic sampling over a lens dimension or ray tracing.

7. The device of claim 1, comprising a display to present the screen image.

8. A device to render two-dimensional (2D) imagery from three-dimensional (3D) model data comprising:
   a processor circuit;
   a shading component for execution on the processor circuit to shade a primitive within a shading image pixel of a shading image that corresponds to a screen image to determine a first color value of the shading image pixel when the primitive is identified as along a path of a shading image sample associated with the shading image pixel and identified as a visible primitive in a set of visible primitives;
a resolving component for execution on the processor circuit to assign the first color value to each screen image sample of a first set of screen image samples of a 3D model that falls within the shading image pixel; and
a sample averaging component for execution on the processor circuit to average color values of a second set of screen image samples of the 3D model that falls within a first screen image pixel of the screen image to determine a second color value of the first screen image pixel, the first screen image pixel at least partially coinciding with the shading image pixel, and the second set of screen image samples differing from and sharing at least one screen image sample with the first set of screen image samples.

9. The device of claim 8, comprising a fine rasterizing component to employ a multitude of screen image samples to rasterize the 3D model to identify a set of visible primitives of the 3D model that are visible from a perspective of the screen image and to generate a multitude of shading point identifiers (SPIDs) to correlate the multitude of screen image samples to a multitude of shading image pixels of the shading image, each SPID of the multitude of SPIDs associated with a screen image sample of the multitude of screen image samples that comprises the first and second sets of screen image samples, and each SPID to correlate a visible primitive of the set of visible primitives to a respective shading image pixel of the multitude of shading image pixels.

10. The device of claim 9, each SPID of the multitude of SPIDs comprising:
an identifier assigned to a visible primitive of the set of visible primitives;
coordinates of a shading image pixel of the multitude shading image pixels in which the screen image sample associated with the SPID falls; and
an indication of a depth of the visible primitive within the shading image pixel associated with the coordinates.

11. The device of claim 10, comprising a shading constraint component to generate from the multitude of SPIDs a set of lists of visible primitives of the set of visible primitives, each list of the set of lists associated with a shading image pixel of the multitude of shading image pixels, and each list comprising at least one identifier of at least one visible primitive of the set of visible primitives that is visible within the shading image pixel associated with the list and an indication of a depth of the at least one visible primitive within the shading image pixel.

12. The device of claim 11, comprising a coarse shading component to employ a single shading image sample associated with a single shading image pixel of the multitude of shading image pixels to identify at least one primitive of the 3D model that exists along a path of the single shading image sample through the 3D model, the shading component to compare an identifier of the at least one primitive to the at least one identifier of a list of the set of lists associated with the single shading image pixel to determine whether to shade the at least one primitive in the single shading image pixel.

13. The device of claim 8, comprising an interface to transmit screen image data representing the screen image to another device.

14. A computer-implemented method for rendering two-dimensional (2D) imagery from three-dimensional (3D) model data comprising:
employing multiple screen image samples per screen image pixel of a screen image to perform fine rasterization of a 3D model to identify a set of visible primitives of the 3D model that are visible from a perspective of the screen image;
employing a single shading image sample per shading image pixel of a shading image that corresponds to the screen image to perform coarse rasterization of the 3D model from the perspective of the screen image to identify at least one primitive along a path of a shading image sample; and
shading a primitive to derive a first color value based on determining the primitive is identified as along the path of the shading image sample and identified as a visible primitive in the set of visible primitives.

15. The computer-implemented method of claim 14, the method comprising:
assigning the first color value to each screen image sample of a first set of screen image samples of the 3D model that falls within the shading image pixel; and
averaging color values of a second set of screen image samples of the 3D model that falls within the first screen image pixel to determine a second color value of the first screen image pixel, the first screen image pixel at least partially coinciding with the shading image pixel, and the second set of screen image samples differing from and sharing at least one screen image sample with the first set of screen image samples.

16. The computer-implemented method of claim 15, the method comprising including a color value associated with a second screen image pixel adjacent the first screen image pixel in the screen image in determining the second color value to impart at least one of a motion blur effect or a depth-of-field effect to at least one object depicted in the screen image.

17. The computer-implemented method of claim 14, the method comprising generating a multitude of shading point identifiers (SPIDs) to correlate a multitude of screen image samples comprising the first and second sets of screen image samples to a multitude of shading image pixels of the shading image, each SPID of the multitude of SPIDs associated with a screen image sample of a multitude of screen image samples, and each SPID to correlate a visible primitive of the set of visible primitives to a respective shading image pixel of the multitude of shading image pixels.

18. The computer-implemented method of claim 17, each SPID of the multitude of SPIDs comprising:
an identifier assigned to a visible primitive of the set of visible primitives;
coordinates of a shading image pixel of the multitude shading image pixels in which the screen image sample associated with the SPID falls; and
an indication of a depth of the visible primitive within the shading image pixel associated with the coordinates.

19. The computer-implemented method of claim 18, the method comprising generating from the multitude of SPIDs a set of lists of visible primitives of the set of visible primitives, each list of the set of lists associated with a shading image pixel of the multitude of shading image pixels, and each list comprising at least one identifier of at least one visible primitive of the set of visible primitives that is visible within the shading image pixel associated with the list and an indication of a depth of the at least one visible primitive within the shading image pixel.

20. At least one non-transitory machine-readable storage medium comprising instructions that when executed by a computing device, cause the computing device to:
- employ multiple screen image samples per screen image pixel of a screen image to perform fine rasterization of a 3D model to identify a set of visible primitives of the 3D model that are visible from a perspective of the screen image;
- employ a single shading image sample per shading image pixel of a shading image that corresponds to the screen image to perform coarse rasterization of the 3D model from the perspective of the screen image to identify at least one primitive along a path of a shading image sample; and
- shade a primitive to derive a first color value based on a determination that the primitive is identified as along the path of the shading image sample and identified as a visible primitive in the set of visible primitives.

21. The at least one non-transitory machine-readable storage medium of claim 20, the computing device caused to generate a multitude of shading point identifiers (SPIDs) to correlate a multitude of screen image samples comprising first and second sets of screen image samples to a multitude of shading image pixels of the shading image, each SPID of the multitude of SPIDs associated with a screen image sample of the multitude of screen image samples, and each SPID to correlate a visible primitive of the set of visible primitives to a respective shading image pixel of the multitude of shading image pixels.

22. The at least one non-transitory machine-readable storage medium of claim 21, each SPID of the multitude of SPIDs comprising:
- an identifier assigned to a visible primitive of the set of visible primitives;
- coordinates of a shading image pixel of the multitude shading image pixels in which the screen image sample associated with the SPID falls; and
- an indication of a depth of the visible primitive within the shading image pixel associated with the coordinates.

23. The at least one non-transitory machine-readable storage medium of claim 22, the computing device caused to redistribute identifiers among at least a subset of the SPIDs of the multitude of SPIDs to impart at least one of a motion blur effect or a depth-of-field effect.

24. The at least one non-transitory machine-readable storage medium of claim 22, the computing device caused to generate from the multitude of SPIDs a set of lists of visible primitives of the set of visible primitives, each list of the set of lists associated with a shading image pixel of the multitude of shading image pixels, and each list comprising at least one identifier of at least one visible primitive of the set of visible primitives that is visible within the shading image pixel associated with the list and an indication of a depth of the at least one visible primitive within the shading image pixel.

25. The at least one non-transitory machine-readable storage medium of claim 24, the computing device caused to compare an identifier of the at least one primitive to the at least one identifier of a list of the set of lists associated with a single shading image pixel to determine whether to shade the at least one primitive in the single shading image pixel.

* * * * *